United States Patent
Tanaka et al.

[11] Patent Number: 5,633,788
[45] Date of Patent: May 27, 1997

[54] POWER CONVERTER CONTROL SYSTEM

[75] Inventors: Shigeru Tanaka; Kazutoshi Miura, both of Tokyo, Japan

[73] Assignee: Kabushiki Kaisha Toshiba, Kawasaki, Japan

[21] Appl. No.: 648,396

[22] Filed: May 15, 1996

Related U.S. Application Data

[63] Continuation of Ser. No. 187,490, Jan. 28, 1994, abandoned.

[30] Foreign Application Priority Data

Feb. 4, 1993 [JP] Japan .................................. 5-017267
Mar. 2, 1993 [JP] Japan .................................. 5-041468

[51] Int. Cl.$^6$ ............................................ H02M 1/12
[52] U.S. Cl. ................................................ 363/41; 363/96
[58] Field of Search .................................. 363/27, 28, 41, 363/95, 96

[56] References Cited

U.S. PATENT DOCUMENTS 5,285,365  2/1994  Yamato et al. ................ 363/41 X
5,341,286  8/1994  Inoue et al. .................... 363/41 X

OTHER PUBLICATIONS

1991 IEEE Industry Applications Society Annual Meeting vol. 1, Papers Presented at the 1991 Industry Applications Conference 26th IAS Annual Meeting, Sep.28–Oct. 4, 1991 pp. 847–853.

*Primary Examiner*—Peter S. Wong
*Assistant Examiner*—Y. J. Han
*Attorney, Agent, or Firm*—Oblon, Spivak, McClelland, Maier & Neustadt, P.C.

[57] ABSTRACT

A control system for a pulse-width modulation controlled power converter composed of self-turn-off devices. The control system includes a voltage command value generator for the power converter, a carrier wave generator and a circuit for correcting at least one of the voltage command value and the frequency of the carrier wave to generate as a corrected voltage command value and a corrected carrier wave. The control system further includes a gate pulse signal generator for receiving a first signal and a second signal and for comparing the first and second signals to generate gate pulse signals to the self-turn-off devices for controlling the power converter based on a comparison result. The voltage command value is taken as e ($-1 \leq e \leq +1$), and a level setting value is taken as $E_a$ ($0 < E_a < 1$). The gate pulse signal generator receives the voltage command value and the carrier wave as the first and second signals when $-E_a \leq e \leq +E_a$. The gate pulse signal generator receives one of the voltage command value and the corrected voltage command value as the first signal and one of the carrier wave and she corrected carrier wave as the second signal when $e < -E_a$ or $+E_a < e$.

10 Claims, 14 Drawing Sheets

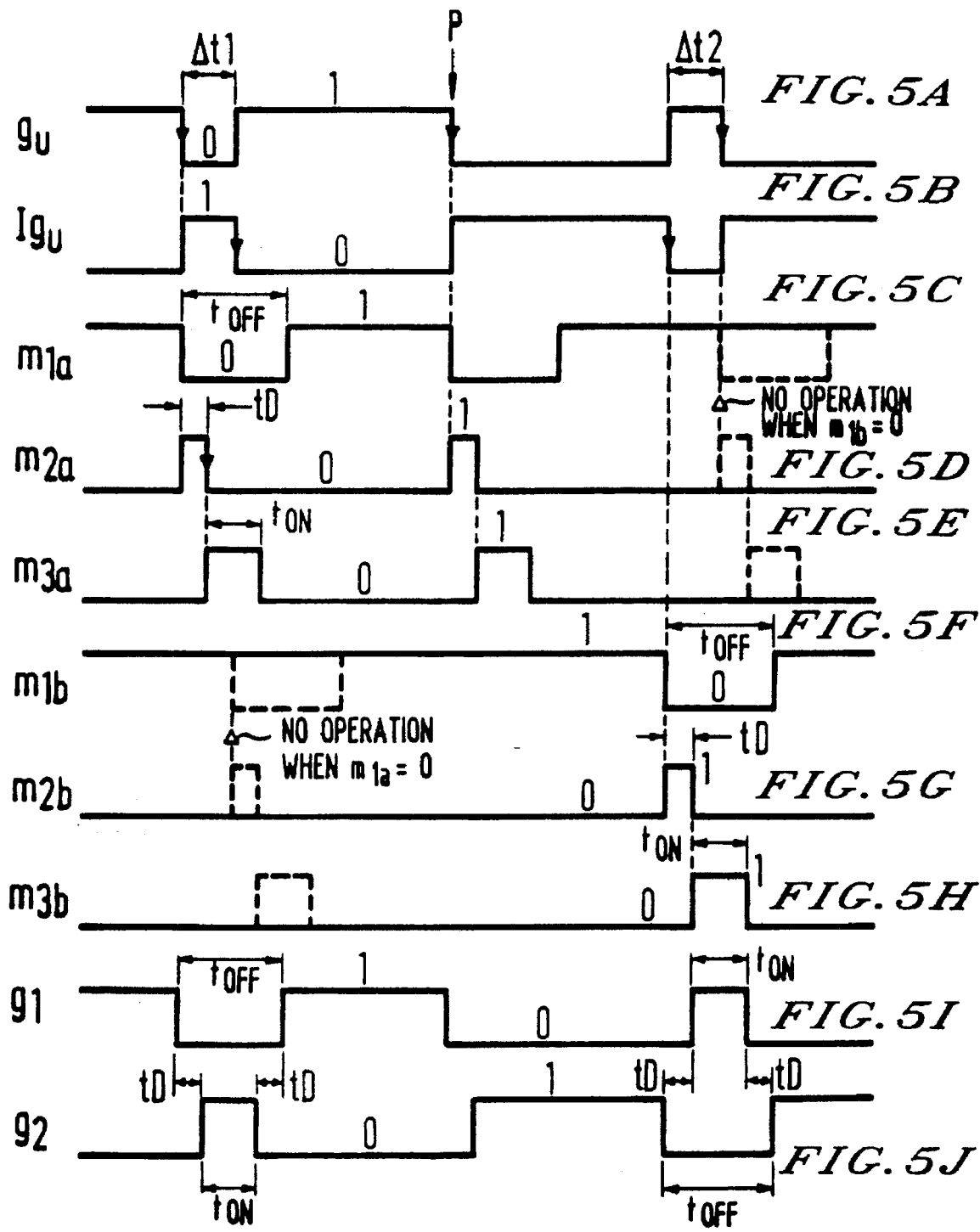

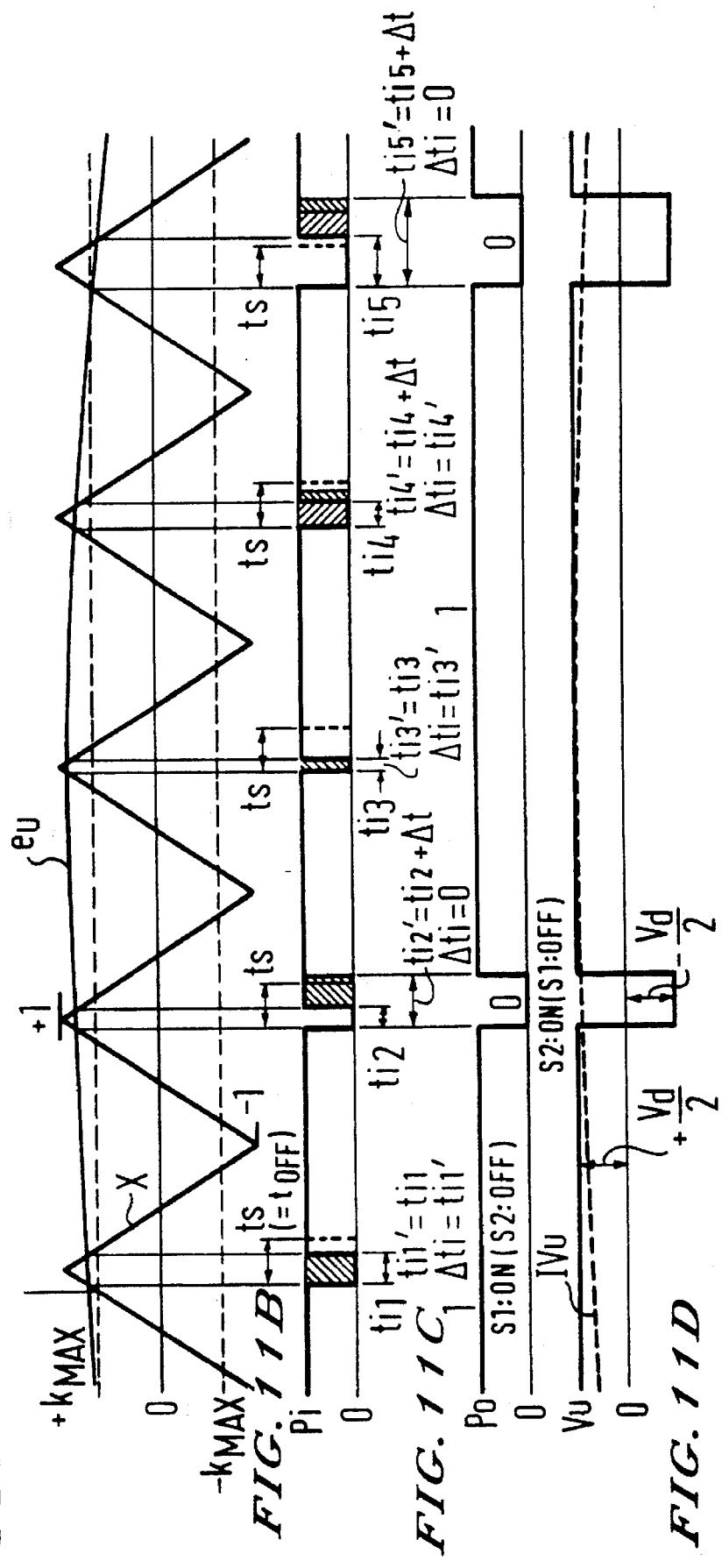

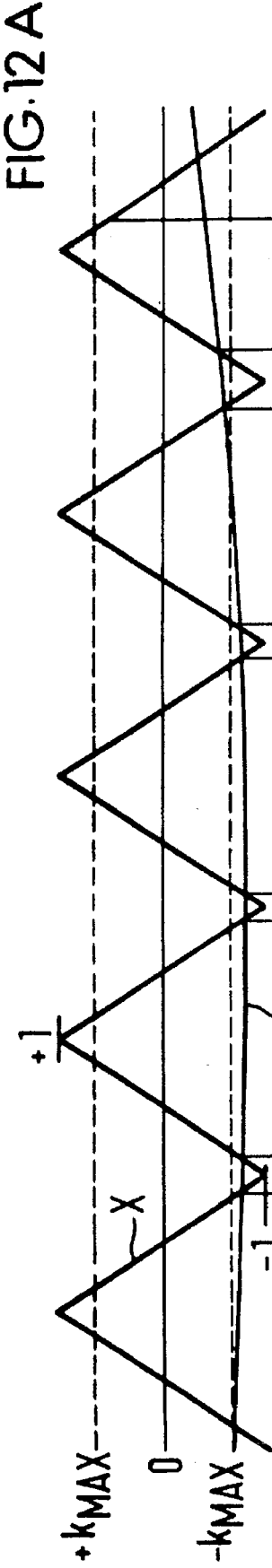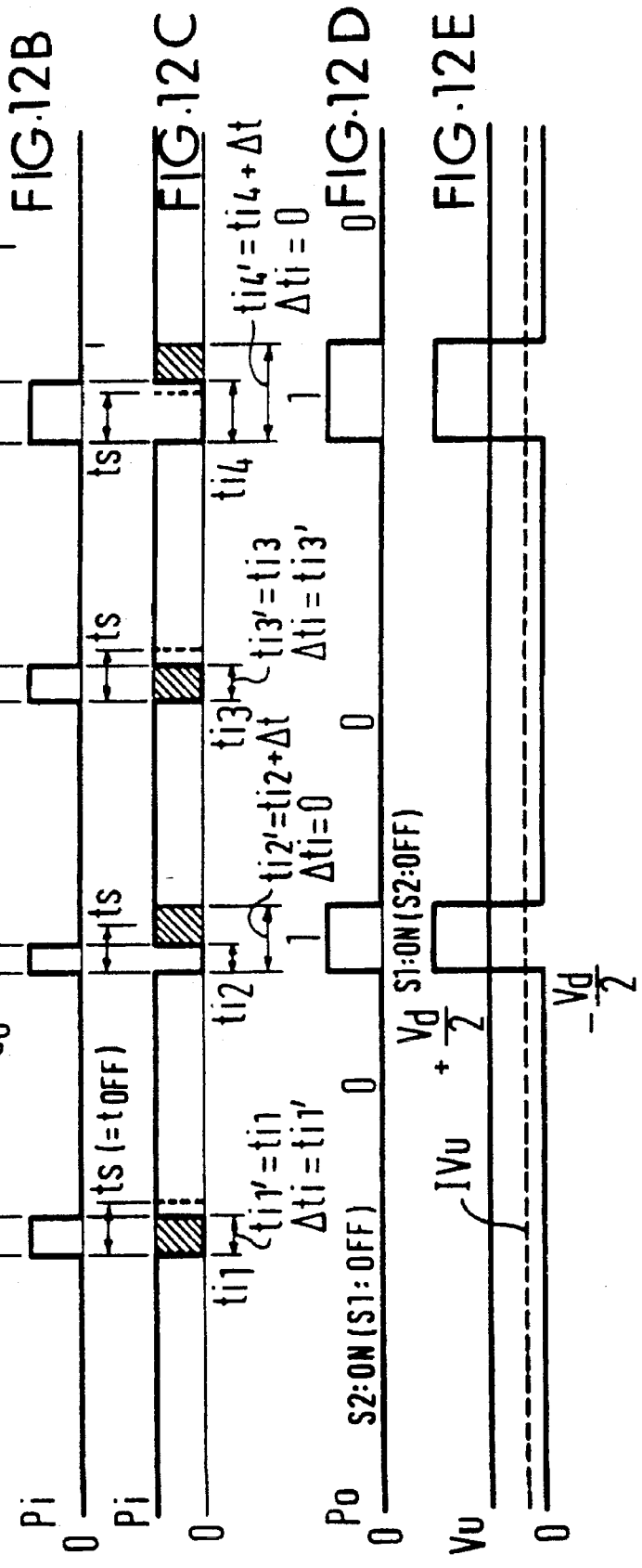

POWER CONVERTER CONTROL SYSTEM

This application is a Continuation of application Ser. No. 08/187,490, filed on Jan. 28, 1994, now abandoned

BACKGROUND OF THE INVENTION

1. Field of the Invention

This invention relates to a power converter control system, and more particularly to a control system for pulse-width modulation-controlled (PWM control) converters which convert AC power to DC power and PWM control inverters which convert DC power to AC power.

2. Description of the Related Art

FIG. 13 shows a schematic diagram of one phase (the U phase) of a prior art PWM control inverter. FIG. 13(a) shows the main circuit of a power converter.

In FIG. 13(a), $V_{d1}$, $V_{d2}$ are DC voltage sources, $S_1$, $S_2$ are self-turn-off devices, $D_1$, $D_2$ are free-wheeling diodes, LOAD is a load and $CT_u$ is a current detector. Also, FIG. 13(b) shows the control circuit for the power converter. Here, $C_u$, $C_1$ are comparators, $G_u(S)$ is a current control compensation circuit, PWMC is a pulse-width modulation control circuit, TRG is a carrier wave generator, SM is a Schmitt circuit and GC is a gate circuit. Here, load current $I_u$ is detected by current detector $CT_u$. This is compared with a current command value $I_{uO}$ by comparator $C_u$ and a deviation $\epsilon_u = I_{uO} - I_u$ is found. This deviation $\epsilon_u$ is amplified by current control compensation circuit $G_u(S)$ to generate a voltage command value $e_u = G_u(S) \cdot \epsilon_u$, which is inputted to pulse-width modulation control circuit PWMC.

In pulse-width modulation control circuit PWMC, carrier wave generator TRG generates a triangular wave X. This is compared with inputted signal $e_u$ by comparator $C_1$, and a gate signal $g_u$ is produced via Schmitt circuit SM. Gate circuit GC inputs this gate signal $g_u$ and produces gate signals $g_1$ and $g_2$ and for self-turn-off devices $S_1$ and $S_2$. The composition of this circuit explained later.

The example described above is an example for single phase output inverters, e.g. U phase, only. In the case of 3-phase output inverters, apart from this, the V and W phase circuits also have similar compositions.

In the following explanation, voltage command value $e_u$ and its related values $K_{MAX}$, X, $E_a$ and $E_b$ use normalized values.

FIG. 14 is a time chart to illustrate the operation of PWM control circuit PWMC in FIG. 13. That is to say, When $e_u \geq X$, $g_u = 1$ and $S_1$: ON ($S_2$:OFF).

When $e_u < X$, $g_u = 0$ and $S_1$:OFF ($S_2$:ON)

At this time, when DC power source voltages $V_{d1}$, $V_{d2}$ are taken as $V_{d1} = V_{d2} = V_d/2$, inverter output voltage $V_u$ becomes $V_u = +V_d/2$, when $S_1$ is ON ($S_2$ is OFF): and $V_u = -V_d/2$, when $S_1$ is OFF ($S_2$ is ON).

The mean value $MV_u$ of inverter output voltage $V_u$ (shown by the pecked line) becomes a value proportional to input signal $e_u$. Therefore, this input signal $e_u$ becomes the inverter voltage command value.

When $I_{uO} > I_u$, deviation $\epsilon_u = I_{uO} - I_u$ becomes a positive value, and voltage command value $e_u$ increases. Therefore, inverter output voltage $V_u$ increases in proportion to $e_u$ and increases load current $I_u$.

Conversely, when $I_{uO} < I_u$, deviation $\epsilon_u = I_{uO} - I_u$ becomes a negative value and voltage command value $e_u$ decreases. Therefore, inverter output voltage $V_u$ decreases and this decreases load current $I_u$.

Control is exercised so that, finally, $I_u = I_{uO}$. When current command value $I_{uO}$ is changed as sine wave form, load current $I_u$ also is controlled to follow this, and a sine wave current can be supplied to load LOAD.

In this way PWM control inverters can obtain output voltage $V_u$ proportional to voltage command value $e_u$. They are therefore widely used in the driving systems of AC motors as variable voltage variable frequency power sources.

However, prior art PWM control inverters have the following problem.

Self-turn-off devices such as gate turn-off thyristors (GTO) are used as devices which compose the inverter. However, in order to protect these self-turn-off devices (hereafter, "devices"), well-known, snubbey circuits are connected in parallel to the devices. When the device is temporarily switched ON in order to initialize (discharge) the capacitor of this snubber circuit, a constant-time ON state must be maintained for the device. Also, minimum ON, OFF times are determined by the characteristic of the device itself, and the pulse-width of the gate signal is supplied to satisfy this.

In FIG. 14, $+k_{MAX}$ and $-k_{MAX}$ express an upper limit value and a lower limit value of voltage command value $e_u$. Output voltage $V_u$, which is proportional to this voltage command value $e_u$ within the limits $+k_{MAX} \geq e_u \geq -k_{MAX}$ can be generated.

When $e_u = +k_{MAX}$, the period of gate signal $g_u = 0$ becomes $\Delta t$, and this satisfies the minimum ON time of device $S_2$ (the minimum OFF time of device $S_1$). Similarly, when $e_u = -k_{MAX}$, the period of gate signal $g_u 1$ becomes $\Delta t$, and this satisfies the minimum ON time of device $S_1$ (the minimum OFF time of device $S_2$).

When $e_u > +k_{MAX}$ or $e_u < -k_{MAX}$, the period of gate signal $g_u = 0$ or $g_u = 1$ becomes shorter than $\Delta t$. Therefore, the minimum ON or OFF times of the devices cannot be satisfied. Because of this, the voltage command value $e_u$ is controlled to be within the limits of $+k_{MAX} \geq e_u \geq -k_{MAX}$ by providing a limiter circuit or the like (not illustrated).

For example, when the carrier frequency $f_c$ is taken as $f_c = 500$ Hz, cycle T of triangular wave X becomes 2 msec, and in order to satisfy the minimum ON time (or minimum OFF time) $\Delta t = 200$ μsec, $k_{MAX} = 0.8$. That is to say, in this case the utilization factor of the inverter is 80%, and the remaining 20% is redundant.

Therefore, a greater inverter capacity had to be prepared for the portion by which the utilization factor was reduced. Thus, the prior art PWM control inverter was an uneconomic system.

SUMMARY OF THE INVENTION

Accordingly, one object of this invention is to provide a power converter control system which executes control so that an output voltage proportional to the input signal can be generated, while ensuring the minimum ON time or the minimum OFF time of the device, and thus can increase the utilization factor of the converter, even when the absolute value of that input signal(the voltage command value) is great, Another object of this invention is to provide a power converter control system which can reduce the voltage of the DC power source and in which reduction in size of the power converter, increased efficiency and cost reduction can be achieved.

These and other objects of this invention can be achieved by providing a control system for a pulse-width modulation controlled power converter composed of self-turn-off devices. The control system includes a voltage command value generator for the power converter, a carrier wave generator and a circuit for correcting at least one of the voltage command value and the frequency of the carrier wave to generate as a corrected voltage command value and a corrected carrier wave. The control system further includes a gate pulse signal generator for receiving a first signal and a second signal and for comparing the first and second signals to generate gate pulse signals to the self-turn-off devices fop controlling the power converter based on a comparison result. The voltage command value is taken as e ($-1 \leq e \leq +1$), and a level setting value is taken as $E_a$ ($0 < E_a < 1$). The gate pulse signal generator receives the voltage command value and the carrier wave as the first and second signals when $-E_a \leq e \leq +E_a$. The gate pulse signal generator receives one of the voltage command value and the corrected voltage command value as the first signal and one of the carrier wave and the corrected carrier wave as the second signal when $e < -E_a$ or $+E_a < e$.

According to one aspect of this invention, there is provided a control system for a pulse-width modulation controlled power converter composed of self-turn-off devices. The control system includes a voltage command value generator for the power converter, a carrier wave generator and a circuit for correcting the frequency of the carrier wave to generate as a corrected carrier wave. The control system further includes a gate pulse signal generator for receiving a first signal and s second signal and for comparing the first and second signals to generate gate pulse signals to the self-turn-off devices for controlling the power converter based on a comparison result. The voltage command value is taken ss e ($-1 \leq e \leq +1$), and a level setting value is taken as $E_a$ ($0 < E_a < 1$). The gate pulse signal generator receives the voltage command value and the carrier wave as the first and second signals when $-E_a \leq e \leq +E_a$. The gate pulse signal generator receives the voltage command value as the first signal and the corrected carrier wave as the second signal when $e < -E_a$ or $+E_a < e$.

According to another aspect of this invention, there is provided a control system for a pulse-width modulation controlled power converter composed of self-turn-off devices. The control system includes a voltage command value generator for the power converter, a carrier wave generator and a circuit for correcting the voltage command value to generate as a corrected voltage command value. The control system further includes a gate pulse signal generator for receiving a first signal and a second signal and for comparing the first and second signals to generate gate pulse signals to the self-turn-off devices for controlling the power converter based on a comparison result. The voltage command value is taken as e ($-1 \leq e \leq +1$), and a level setting value is taken as $E_a$ ($0 < E < 1$). The gate pulse signal generator receives the voltage command value and the carrier wave as the first and second signals when $-E_a \leq e \leq +E_a$. The gate pulse signal generator receives the corrected voltage command value as the first signal and the carrier wave as the second signal when $e < -E_a$ or $+E_a < e$.

These and other objects of this invention can be further achieved by providing a control system for a pulse-width modulation controlled power converter composed of self-turn-off devices. The control system includes a voltage command value generator for the power converter, a carrier wave generator and a gate pulse signal generator for receiving the voltage command value and the carrier wave and for comparing the voltage command value and the carrier wave to generate gate pulse signals based on a comparison result. The control system further includes a correction circuit connected to receive the voltage command value and the gate pulse signals for generating corrected gate pulse signals to the self-turn-off devices for controlling the power converter. The voltage command value is taken as e ($-1 \leq e \leq +1$), and a level setting value is taken as $E_a$ ($0 < E_a < 1$). The correction circuit generates the gate pulse signals as the corrected gate pulse signals as they stand, when $-E_a \leq e \leq +E_a$. The correction circuit corrects a pulse-width (ti) of the gate pulse signals when $e < -E_a$ or $+E_a < e$, and generates gate pulse signals with a corrected pulse-width (ti') as the corrected gate pulse signals only when the corrected pulse-width (ti') is equal to or larger than a set time (ts).

The following operation can be obtained when using this invention. Normally, voltage command value e ($-1 \leq e \leq +1$) is supplied from the circuit which controls the output current of the power converter.

When the maximum modulation factor of PWM control is taken as $k_{MAX}$ ($0 < k_{MAX} < 1$), the output voltage of the power converter is controlled by normal pulse-width modulation control when $-k_{MAX} \leq e \leq +k_{MAX}$.

Also, when $e < -k_{MAX}$ or $+k_{MAX} < e$, the output voltage of the power converter is controlled by adjusting the pulse interval of the pulse with the constant width $\Delta t$ which satisfies the minimum ON time (or minimum OFF time) of the device.

The following further operation can be obtained when using this invention. That is to say, when the carrier wave frequency of normal PWM control is taken as $F_{co}$, the carrier wave frequency of the PWM control circuit is altered such that $f_c = f_{co} \cdot (1-|e|)/(1-k_{MAX})$ when $e < -k_{MAX}$ or $k_{MAX} < e$. If a gate signal is produced by comparing this new carrier wave (triangular wave) and voltage command value e, a pulse with an almost constant width $\Delta t$ can be obtained. Moreover, since frequency $f_c$ reduces as the absolute value |e| of voltage command value e approaches, 1, a voltage proportional to voltage command value e can be obtained for the output voltage of the power converter even when voltage command value e is within the region of $e < -k_{MAX}$ or $+k_{MAX} < e$.

In this way, when using the power converter control system of this invention, e voltage proportional to voltage command value e is obtained for the output voltage of the power converter even when voltage command value e is within the region of $e < -k_{MAX}$ or $+k_{MAX} < e$. Moreover, a pulse with a constant width $\Delta t$ which satisfies the minimum ON time (or minimum OFF time) of the device can be obtained. Therefore it is possible to increase the utilization factor of the power converter to 100%, end the prior art problem can be solved.

That is to say, it is possible to continue to obtain output voltage $V_u$ proportional to voltage command value $e_u$ even in the region where the absolute value of the voltage command value $e_u$ is greater than the maximum modulation factor $k_{MAX}$ of the PWM control. In addition, it is possible to satisfy the minimum ON time or the minimum OFF time of the devices which compose the converter. As a result, in the case of PWM control of a power converter such as an inverter or a converter, it is possible greatly to increase the utilization factor of that converter. Also, it is possible to reduce the voltage $V_d$ of the DC power source by that amount. Thus, it becomes possible to achieve reduction in size, increased efficiency and cost-reduction of the converter.

When using this invention, the following still further operation can be obtained. That is to say, it is possible to generate voltage $V_u$ from the converter proportional to voltage command value $e_u$ mean value-wise, while selecting either the generation of a pulse which satisfies the minimum ON time (or minimum OFF time) Δt of the device or the elimination of generating that pulse, when the original voltage command value $e_u$ is within the regions $e_u < -E_a$ or $e_u > +E_a$. As a result, it becomes possible to increase the utilization factor of the converter up to 100%.

When using this invention, the following yet further operation can be obtained. That is to say, when voltage command value e is $-k_{MAX} \leq e \leq +k_{MAX}$, the output voltage of the power converter is controlled by normal pulse-width modulation control. Also, when $e < -k_{MAX}$ or $+k_{MAX} < e$, a pulse-width Δti'=ti+Δti of a new control pulse is obtained by adding an error time Δti to a width ti of a control pulse Pi. This pulse-width ti' is compared with a set time ts. When ti'≧ts, the output pulse is outputted and, at the same time, Δti=0 is stored in the memory. When ti'<ts, Δt=ti' is stored in the memory without outputting the output pulse. Then, error time Δti is controlled so that it is reflected in the following control pulse. As a result, it is possible to obtain an output voltage which is proportional to the voltage command value e. Moreover, it is possible to satisfy the minimum OFF time (or minimum ON time) of the device. Therefore, it becomes possible to increase the utilization factor of the converter to 100% and thus to solve the prior art problem.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is a time chart to illustrate the operation of the gate circuit GC in FIG. 4;

FIG. 11 is a diagram to illustrate PWM control operation in FIG. 9 when the voltage command value is positive;

FIG. 12 is a diagram to illustrate PWM control operation in FIG. 9 when the voltage command value is negative;

DETAILED DESCRIPTION OF THE PREFERRED EMBODIMENTS

Figure 1A:
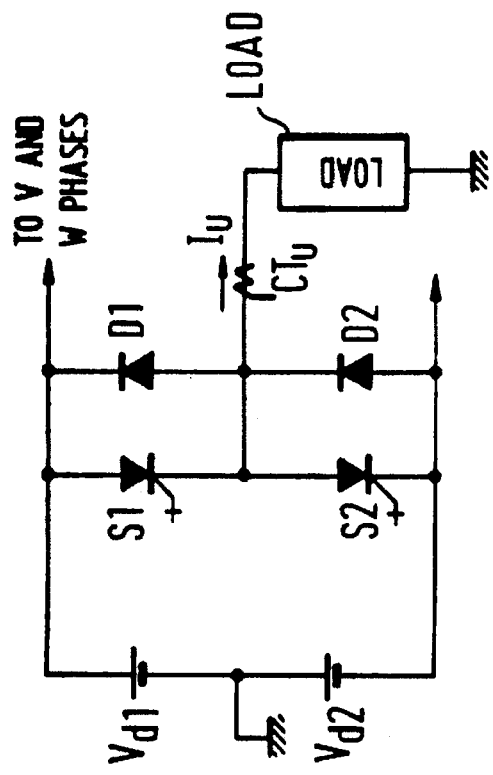
FIG. 1 is a schematic diagram of the main circuit and the control circuit showing an embodiment of a power converter control system of this invention.

Referring now to the drawings, wherein like reference numerals designate identical or corresponding parts throughout the several views, the embodiments of this invention will be described below.

Figure 1B:
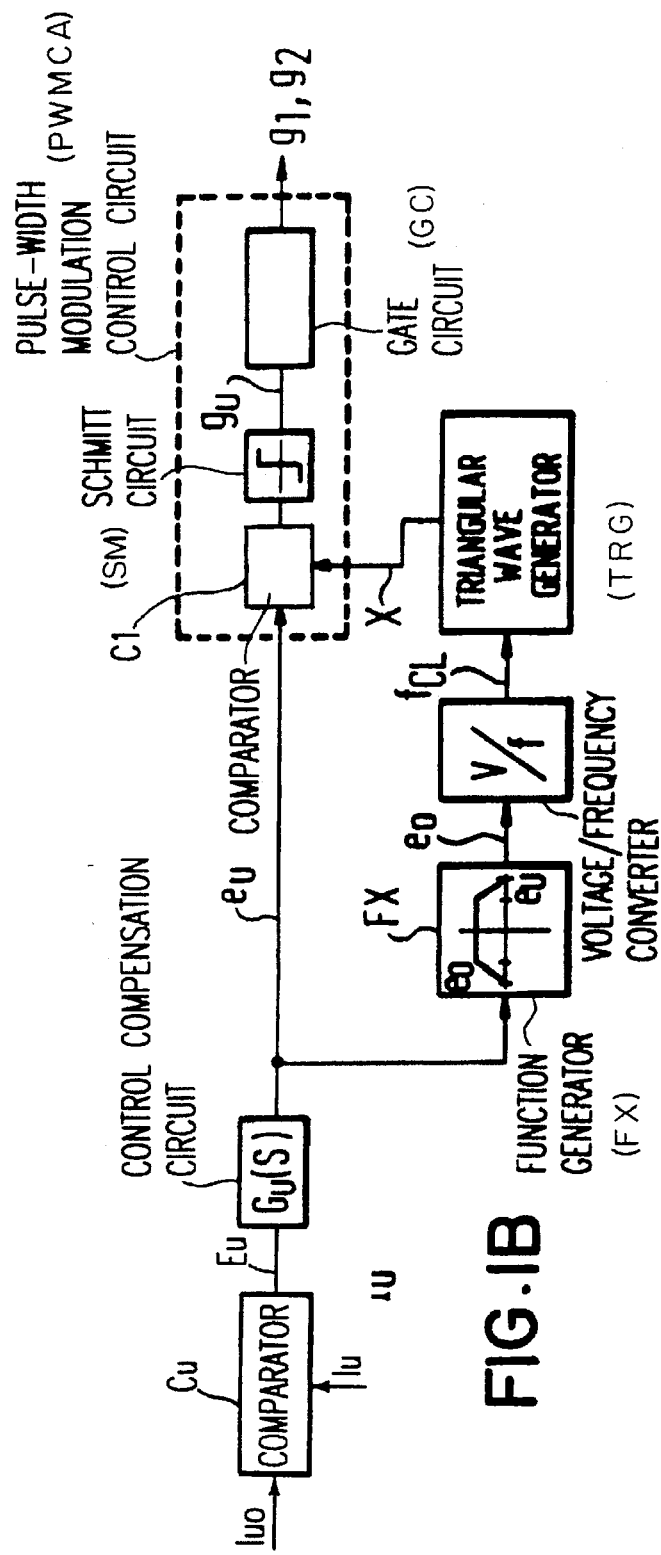

FIG. 1 shows an embodiment of a power converter control system of this invention. FIG. 1(a) is a schematic diagram of the main circuit, and FIG. 1(b) is a block diagram of the control circuit.

Figure 13A:
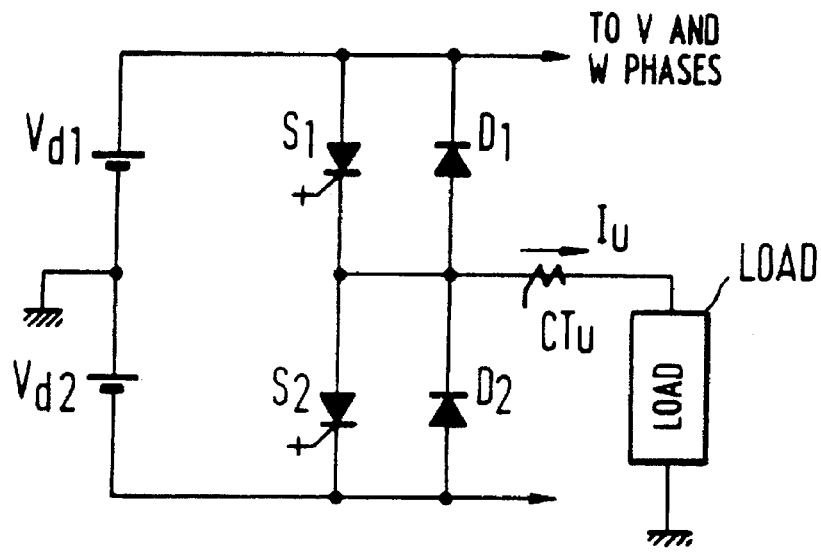
FIG. 13 is a schematic diagram of the main circuit and the control circuit to illustrate a prior art power converter control system.

In FIG. 1(a), $V_{d1}$, $V_{d2}$ are DC voltage sources, $S_1$, $S_2$ are self-turn-off devices $D_1$, $D_2$ are free-wheeling diodes, LOAD is load and $CT_u$ is current detector. The composition of this main circuit is the same as that in FIG. 13(a). As shown in FIG. 1(b), comparator $C_u$, current control compensation circuit $G_u(S)$, a function generator FX, a voltage/frequency converter V/f, triangular wave generator TRG and a pulse-width modulation control circuit (PWM control circuit) PWMCA are provided as the control circuit. PWM control circuit PWMCA is composed of comparator $C_1$, Schmitt circuit SM and gate circuit GC.

This drawing only shows the portion for one phase (e.g. the U phase). In the case of a 3-phase load, the portions for the other two phases (V and W phases) are composed in the same way.

U-phase load current $I_u$ is detected by current detector $CT_u$, and is inputted to comparator $C_u$ of the current control circuit. Comparator $C_u$ compares current command value $I_{uO}$ and current detection value $I_u$, and finds the deviation $\epsilon_u = I_{uO} - I_u$. This deviation $\epsilon_u$ is amplified by the following control compensation circuit $G_u(S)$ to Generate voltage command value $e_u$.

This voltage command value $e_u$ is inputted to PWM control circuit PWMCA and, at the same time, is inputted to function generator FX.

Figure 2:
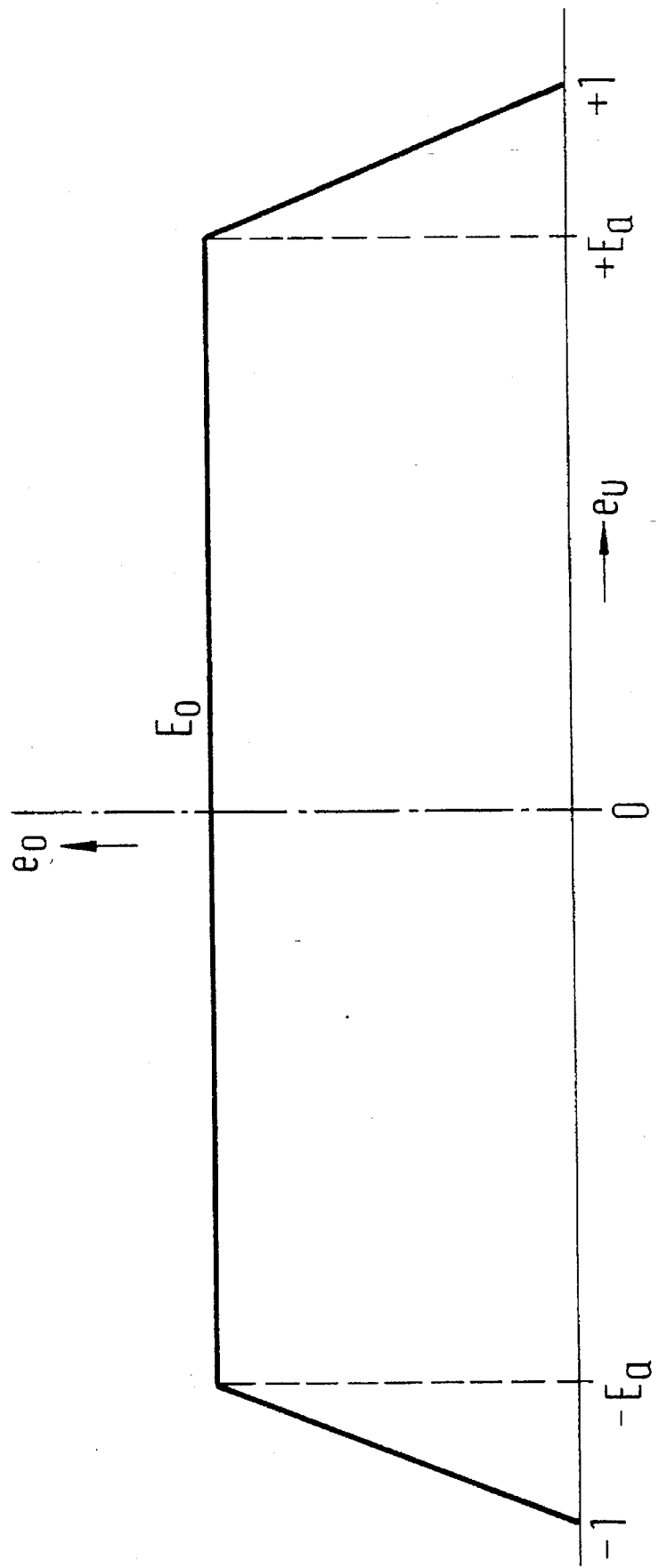
FIG. 2 is a characteristic graph to illustrate the operation of the control system in FIG. 1.

FIG. 2 shows a practical example of the input/output characteristics of function generator FX. That is to say, when the absolute value of input signal $e_u$ is at or below a certain level setting value $E_a$ ($0 \leq E_a \leq 1$), the output signal is taken as $e_0 = E_0$ =constant. When the absolute value of input signal $e_u$ is greater than $E_a$, the output signal is taken as $e_0 = E_0 \cdot (1-|e_u|)/(1-E_a)$.

Output signal $e_0$ of function generator FX is inputted to the following voltage/frequency converter V/f, and is converted by voltage/frequency conversion to a clock signal of frequency $f_{CL}$ proportional to $e_0$. This clock signal is inputted to the following triangular wave generator TRG and determines the carrier wave frequency $f_c$ of PWM control.

That is to say, frequency $f_c$ of triangular wave X becomes constant at $f_c = f_{co}$ when the absolute value of voltage command value $e_u$ is $|e_u| \leq E_a$, and becomes $f_c = f_{co} \cdot (1-|e_u|)/(1-E_a)$ when $|e_u| > E_a$.

When the maximum modulation factor of PWM control is taken as $k_{MAX}$ and it is set that $E_a = k_{MAX}$, frequency $f_c$ of triangular wave X becomes constant ($f_c = f_{co}$) when $|e_u| \leq k_{MAX}$, and becomes $f_c = f_{co} \cdot (1-|e_u|)/(1-k_{MAX})$ when $|e_u| > k_{MAX}$.

Figure 3:
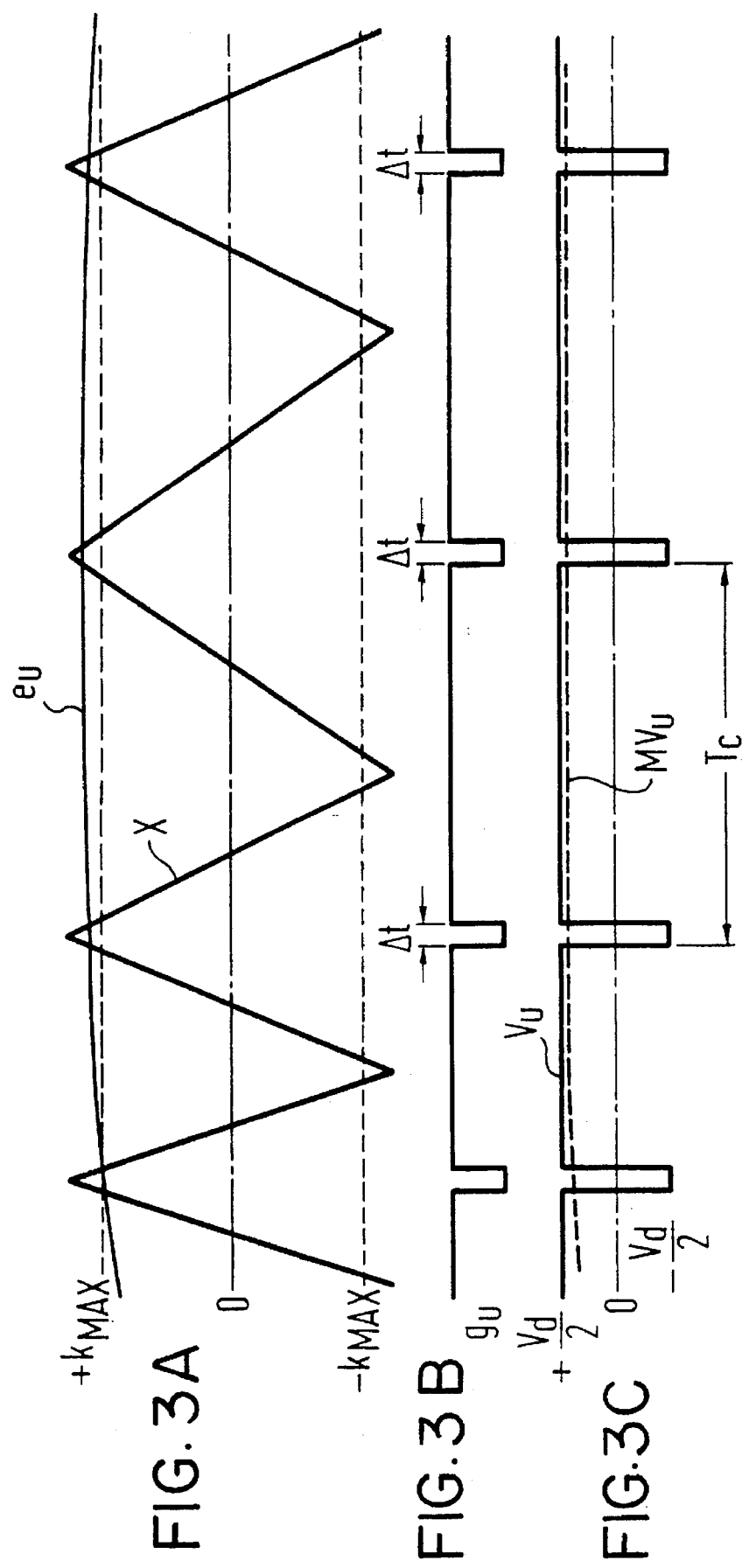
FIG. 3 is a time chart to illustrate the operation of the system in FIG. 1.

FIG. 3 shows an example of the PWM control operation of the system in FIG. 1. In the drawing, $e_u$ is voltage command value, X is carrier wave (triangular wave) signal, $+k_{MAX}$ and $-k_{MAX}$ shown by the pecked lines are the maximum modulation factors of prior art PWM control, $g_u$ is the signal, end $V_u$ is inverter output voltage.

The following is a description of the case when $E_a = k_{MAX}$ is set. When $-k_{MAX} \leq e_u \leq +k_{MAX}$, the frequency of PWM control carrier wave becomes constant ($f_c=f_{co}$), and normal pulse-width modulation control is executed. In PWM control, voltage command value $e_u$ end triangular wave X are compared, and gate signal $g_u$ of devices $S_1$ and $S_2$ produced. That is to say, when $e_u \geq X$, $g_u=1$ and $S_1$:ON ($S_2$:OFF); and when $e_u \geq X$, $g_u=0$ and $S_2$:ON ($S_1$:OFF).

When the DC source voltage $V_{d1}$, $V_{d2}$ are taken as $V_{d1}=V_{d2}=V_d/2$, the output voltage $V_u$ of the inverter becomes $V_u=+V_d/2$, when $S_1$ is ON ($S_2$ is OFF); and $V_u=-V_d/2$, when $S_2$ is ON ($S_1$ is OFF).

Mean value $MV_u$ of inverter output voltage $V_u$ becomes a value proportional to voltage command value $e_u$. In this case the "1" and "0" periods of gate signal $g_u$ always becomes longer than the minimum ON time (or minimum OFF time) $\Delta t$ of devices $S_1$ and $S_2$ which compose the inverter. Thus there is no problem of any kind.

Next, the operation when $e_u > +k_{MAX}$ ts described with reference to FIG. 3 In the region of $e_u > +k_{MAX}$, PWM control carrier wave frequency $f_c$ is obtained by $f_c=f_{co} \cdot (1-e_u)/(1-k_{MAX})$. When gate signal $g_u$ is produced by comparing this carrier wave (triangular wave) X and voltage command value $e_u$.

when $e_u \geq X$, $g_u=1$ and $S_1$:ON ($S_2$:OFF); and when $e_u < X$, $g_u=0$ and $S_2$:ON ($S_1$:OFF).

Thus, mean value MV of inverter output voltage $V_u$ becomes a value proportional to voltage command value $e_u$ in the same way as in normal PWM control. When taking the cycle of triangular wave X as $T_c=1/f_c$ and the period of gate signal $g_u=0$ as $\Delta t$, mean value $MV_u$ of inverter output voltage $V_u$ is $$MV_u=(V_d/2) \cdot (T_c-2 \cdot \Delta t)/T_c.$$

Since this is proportional to voltage command value $e_u$, the relationship $$e_u=(T_c-2 \cdot \Delta t)/T_c$$

is established, and therefore $$\begin{aligned} \Delta t &= T_c(1-e_u)/2 \\ &= (1-e_u)/(2 \cdot f_c) \\ &= (1-e_u)(1-k_{MAX})/\{2 \cdot f_{co}(1-e_u)\} \\ &= (1-k_{MAX})/(2 \cdot f_{co}) \end{aligned}$$

Thus period $\Delta t$ becomes a constant value regardless of command value $e_u$ even in the region of $e_u$.

In this way, mean value $MV_u$ of inverter output voltage $V_u$ can be obtained as a value proportional to voltage command value $e_u$ even in the region of $e_u > +k_{MAX}$. Also, the minimum ON time (minimum OFF time) $\Delta t$ of devices $S_1$ and $S_2$ which compose the inverter can be satisfied.

In the same way also, when $e_u < -k_{MAX}$, mean value $MV_u$ of inverter output voltage $V_u$ becomes a value proportional to voltage command value $e_u$. Also, the period $\Delta t$ of gate signal $g_u=1$ becomes constant, and the minimum ON time (minimum OFF time) of devices $S_1$ and $S_2$ which compose the inverter can be satisfied.

In the actual system, when carrier wave frequency $f_c$ is changed following voltage command value $e_u$, an operation error is generated, and also there is sometimes a problem with the accuracy of triangular wave X. As a result, when $e_u < +k_{MAX}$, the period when the gate signal $g_u$ should become $g_u=0$ (or when $e_u > -k_{MAX}$, the period when the gate signal $g_u$ should become $g_u=1$) does not become accurately equal to $\Delta t$. In this case, it is allowable for inverter output voltage $V_u$ to be controlled with a certain degree of error in relation to voltage command value $e_u$. However, if the minimum ON time (or minimum OFF time) $\Delta t$ of devices $S_1$ and $S_2$ cannot be satisfied, there will be a risk of the devices $S_1$ and $S_2$ being damaged. Therefore, gate signal $g_u$ should be processed by gate circuit GC so that the minimum ON time (or minimum OFF time) of the devices are satisfied whatever the case may be.

Figure 4:
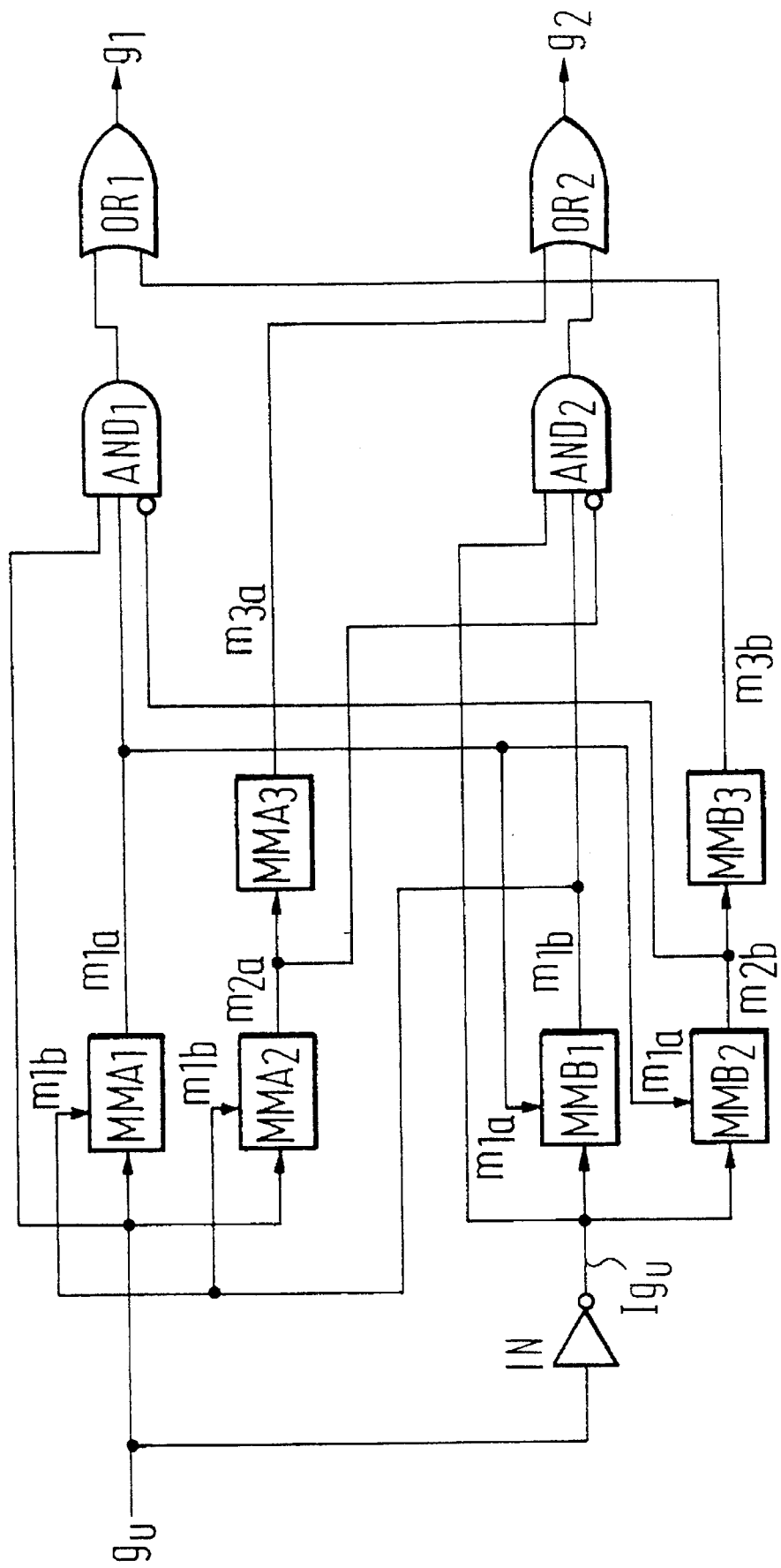
FIG. 4 is a block diagram of the gate circuit GC of the system in FIG. 1.

FIG. 4 shows gate circuit GC of the system in FIG. 1. In the drawing, IN is an inversion circuit, MMA1 to MMA3 and MMB1 to MMB3 are monomulti circuits, AND1 and AND2 are AND circuits and OR1 and OR2 are OR circuits.

Also, FIG. 5 shows a time chart to illustrate the operation of FIG. 4.

In FIG. 5, $g_u$ is a gate signal;

$Ig_u$ is an inversion signal of gate signal $g_u$ obtained via inversion circuit IN;

$m_{1a}$ is an output signal of monomulti MMA1 which operates at the falling of gate signal $g_u$;

$m_{2a}$ is an output signal of monomulti MMA2 which operates at the falling of gate signal $g_u$;

$m_{3a}$ is an output signal of monomulti MMA3 which operates at the falling of output signal $m_{2a}$;

$m_{1b}$ is an output signal of monomulti MMB1 which operates at the falling of inversion signal $Ig_u$;

$m_{2b}$ is an output signal of monomulti MMB2 which operates at the falling of inversion signal $Ig_u$;

$m_{3b}$ is an output signal of monomulti MMB3 which operates at the falling of output signal $m_{2b}$; and $g_1$ and $g_2$ are gate signals of devices $S_1$ and $S_2$.

Monomulti circuits MMA2 and MMB3 supply dead times $t_D$ for preventing inverter devices $S_1$ and $S_2$ switching ON simultaneously. Also, monomulti circuits MMA1 and MMB1 supply minimum OFF times $t_{OFF}$ for the devices, and monomulti circuits MMA3 and MMB3 supply minimum ON times $t_{ON}$ for the devices. These have the relationship $t_{ON}=t_{OFF}-2 \cdot t_D$.

Gate signals $g_1$ and $g_2$ are obtained by executing the following logic operations following the circuit in FIG. 4. Here, $Im_{2a}$ is taken as an inversion value of signal $m_{2a}$ and $Im_{2b}$ as an inversion value of signal $m_{2b}$.

$$g_1=g_u \times m_{1a} \times Im_{2b}+m_{3b}$$

$$g_2=Ig_u \times m_{1b} \times Im_{2a}+m_{3a}.$$

When gate signal $g_1$ is "1", device $S_1$ is ON, and when it is "0", $S_1$ is OFF. Also, when gate signal $g_2$ is "1", device $S_2$ is ON, and when it is "0", device $S_2$ is OFF. There is a dead time $t_D$ when devices $S_1$ and $S_2$ are shifting between ON and OFF respectively, and this prevents devices $S_1$ and $S_2$ being ON simultaneously.

Monomulti circuits MMA1 and MMA2 operate when signal $g_u$ shifts from "1" to "0". However, when signal $m_{1b}$ is 0, it provides an interlock so that they do not operate. Similarly, monomulti circuits MMB1 and MMB2 operate when inversion signal $Ig_u$ shifts from "1" to "0". However, when signal $m_{1a}$ is 0, it provides an interlock so that they do not operate.

First, the case when period $\Delta t_1$ of $g_u=0$ has become shorter than minimum OFF time $t_{OFF}$ is described. Monomulti circuits MMA1 and MMA2 operate through the falling of signal $g_u$. Signal $m_{1a}$ becomes "0" only during time $t_{OFF}$, and signal $m_{2a}$ becomes "1" only during time $t_D$. Also, monomulti circuit MMA3 operates at the falling of signal $m_{2a}$. Signal $m_{3a}$ becomes "1" only during time $t_{ON}$. Inversion signal $Ig_u$ falls at time $\Delta t_1$ after the fall of signal $g_u$. However, since signal $m_{1a}$ has already become "0", MMB1, MMB2 and MMB3 will not operate. Gate signal $g_1$ of device $S_1$ is obtained by the logic operation described above, and becomes "0" only during time $t_{OFF}$ from the point of the falling of gate signal $g_u{'}$, and this satisfies the minimum OFF time of device $S_1$. Also, gate signal $g_2$ of device $S_2$ becomes "1" delayed only by time $t_D$ from the point of the falling of signal $g_u$, and device $S_2$ is caused to be ON only duping time $t_{ON}$. Therefore, this satisfies the minimum ON time of device $S_2$.

Next, the case when period $\Delta t_2$ of signal $g_u=1$ has become shorter than minimum OFF time $t_{OFF}$ is described. Monomulti circuits MMB1 and MMB2 operate through the falling of inversion signal $Ig_u$. Signal $m_{1b}$ becomes "0" only during time $t_{OFF}$, and signal $m_{2b}$ becomes "1" only during time $t_D$. Also, monomulti circuit MMB3 operate at the falling of signal $m_{2b}$. Thus signal $m_{3b}$ becomes "1" only during time $t_{ON}$. Signal $g_u$ falls at time $\Delta t_2$ after the fall of inversion signal $Ig_u$. However, since signal $m_{1b}$ has already become "0", MMA1, MMA2 and MMA3 will not operate. As a result, gate signal $g_2$ of device $S_2$ becomes "0" only during the time $t_{OFF}$ from the point of the falling of inversion signal $Ig_u$, and this satisfies the minimum OFF time of device $S_2$. Also, gate signal $g_1$ of device $S_1$ becomes "1" delayed only by time $t_D$ from the point of the falling of inversion signal $Ig_u$, and device $S_1$ is caused to be ON only during time $t_{ON}$. Therefore, this satisfies the minimum ON time of device $S_1$.

In this gate circuit, when the period in which gate signal $g_u$ becomes "1" or "0" becomes longer than minimum OFF time $t_{OFF}$, gate signals $g_1$ and $g_2$ are outputted as they stand by taking only dead time $t_D$ into consideration. That it to say, at point p in FIG. 5, signal $g_u$ falls and monomulti circuits MMA1 to MMA3 operate. However, since the period in which $g_u=0$ after point P is longer than time $t_{OFF}$, gate signal $g_1$ becomes the same as gate signal $g_u$. Also, gate signal $g_2$ is delayed by dead time $t_D$ by signal $m_{2a}$ of monomulti circuit MMA2 and becomes $g_2=1$.

In this way, even if the pulse-width of gate signal becomes narrower than the minimum ON time or minimum OFF time of the device due to operational error in PWM control, this is adjusted by gate circuit GC so that the device will not be damaged. In this case, a slight error may be included in the proportional relationship between voltage command value $e_u$ and the mean value of inverter output voltage $V_u$, but this will not create any problem in practical use.

When using the power converter control system in the above embodiment, output voltage $V_u$ of inverter proportional to voltage command value $e_u$ can be continuously obtained even in the region where the absolute value of voltage command value $e_u$ is greater than the maximum modulation factor $k_{MAX}$ of the PWM control. Also, it is possible to satisfy the minimum ON time or minimum OFF time of the devices which compose the converter. As a result, when exercising PWM control of power converters such as inverters or converters, the utilization factor of the converter can be greatly increased. Thus, reduction in the voltage $V_d$ of the DC power becomes possible. Therefore reduction in size of the converter, increased efficiency and cost-reduction can be achieved.

Figure 6A:
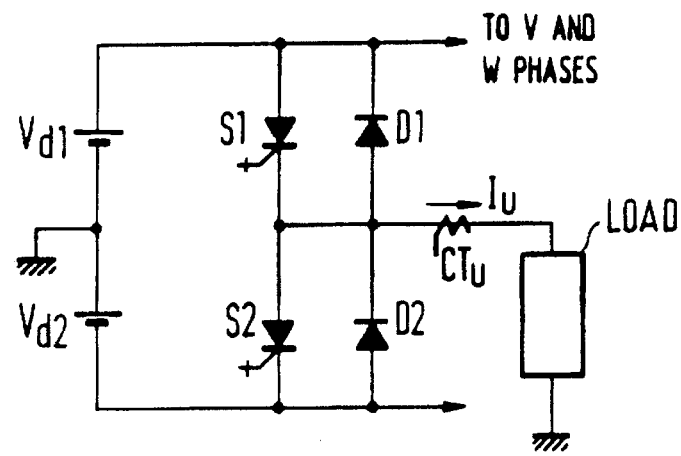
FIG. 6 is a schematic diagram of the main circuit and the control circuit showing another embodiment of a power converter control system of this invention.
Figure 6B:
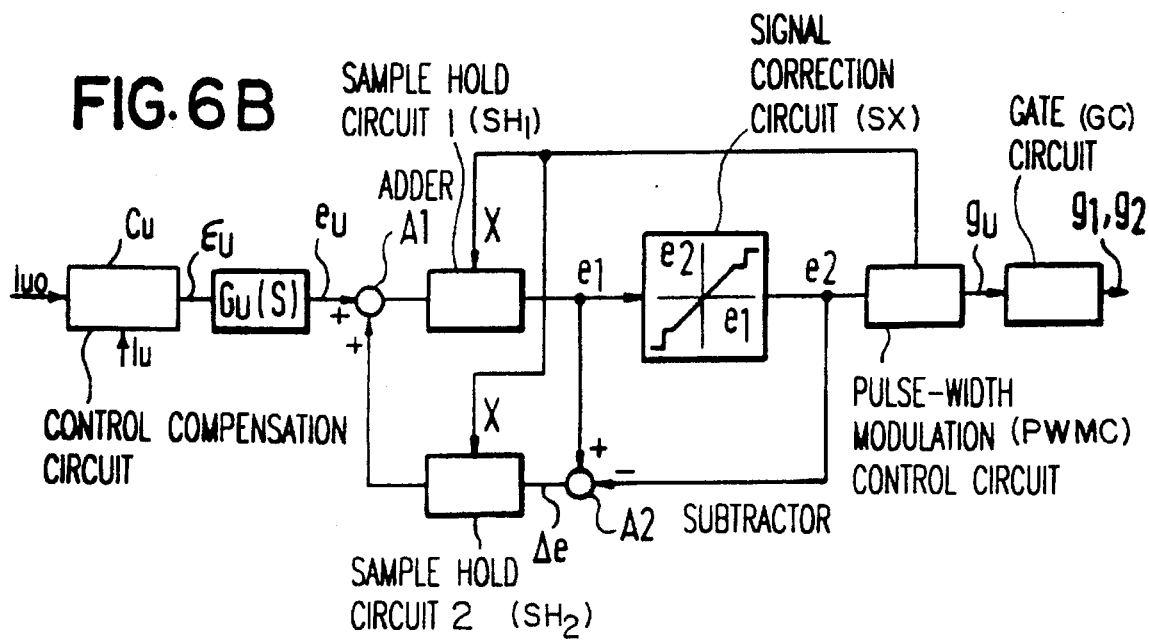

FIG. 6 shows another embodiment of the power converter control system of this invention. FIG. 6(a) is a schematic diagram of the main circuit, and FIG. 6(b) is a block diagram of its control circuit.

In FIG. 6(a), $V_{d1}$, $V_{d2}$ are DC voltage sources, $S_1$, $S_2$ are self-turn-off devices, $D_1$, $D_2$ are free-wheeling diodes, LOAD is load and $CT_u$ is current detector. The composition of this main circuit is the same as that in FIG. 1(a). However, the composition of the control circuit in FIG. 6(b) differs. That is to say the control circuit shown in FIG. 6(b) is composed of comparator $C_u$, current control compensation circuit $G_u(S)$, an adder $A_1$, a subtractor $A_2$, sample hold circuits $SH_1$, $SH_2$, a signal correction circuit SX, pulse-width modulation control circuit (PWM control circuit) PWMC and gate circuit GC. This drawing shows only the portion for one phase (e.g. the U phase). In the case of a 3-phase load, the portions for the other two phases (V and W phases) are composed in the same way.

U-phase load current $I_u$ is detected by current detector $CT_u$, and is inputted to comparator $C_u$ of the current control circuit. Comparator $C_u$ compares current command value $I_{uO}$ and current detection value $I_u$, and finds the deviation $\epsilon_u=I_{uO}-I_u$. This deviation $\epsilon_u$ is amplified by the following control compensation circuit $G_u(S)$ to generate an original voltage command value $e_u$. This original voltage command value $e_u$ is inputted to adder $A_1$ and added to an error signal $\Delta e$ which is held by second sample hold circuit $SH_2$.

First sample hold circuit $SH_1$ takes in an output signal $e_1=e_u+\Delta e$ of adder $A_1$ in synchronization with the PWM control carrier wave signal X from PWM control circuit PWMC, and holds that value. Output signal $e_1$ of that sample hold circuit $SH_1$ is inputted to the following signal correction circuit SX, and is converted to a new voltage command value $e_2$ depending on its size.

Figure 7:
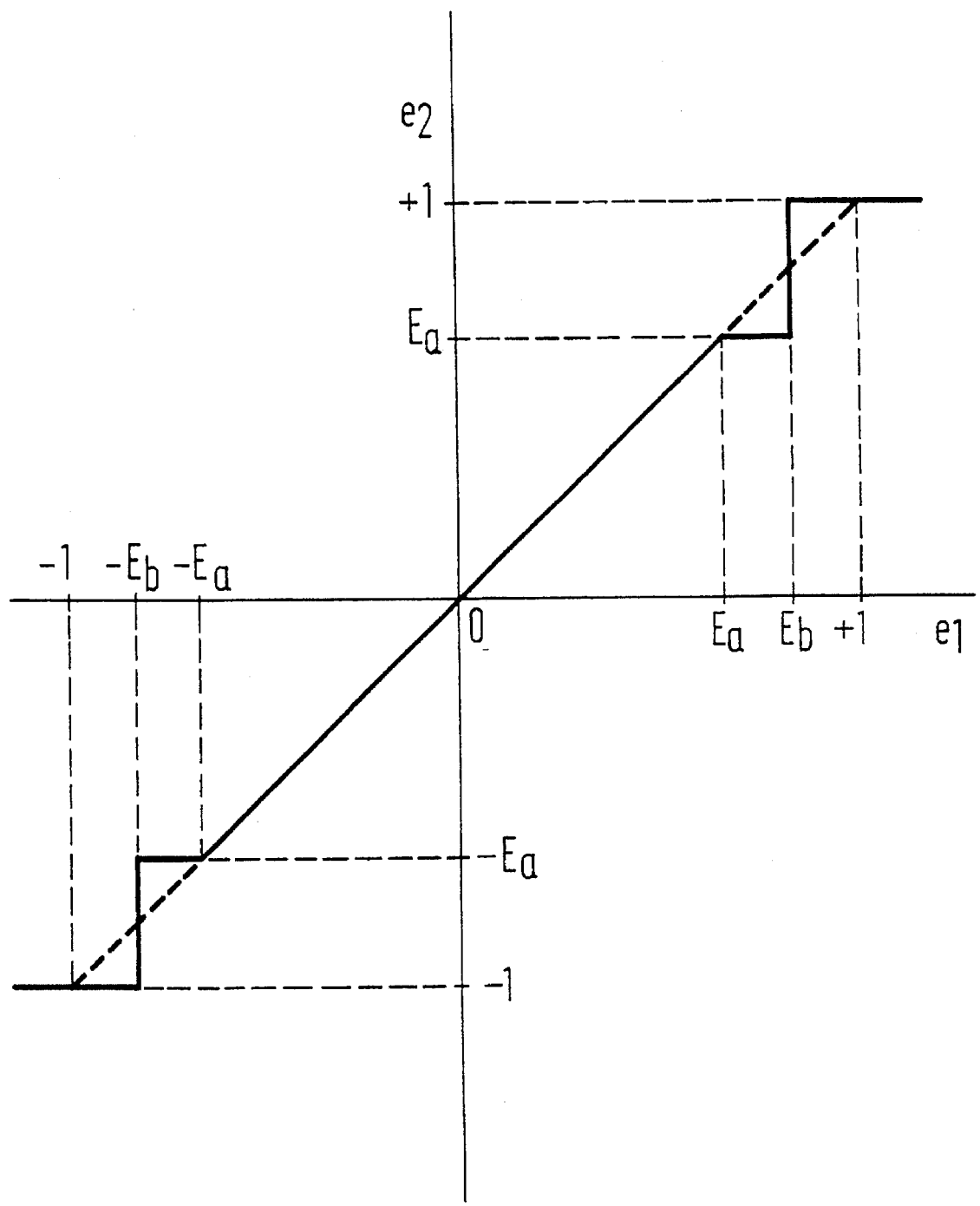
FIG. 7 is a characteristic graph to illustrate the control operation of the system in FIG. 6.
Figure 8A:
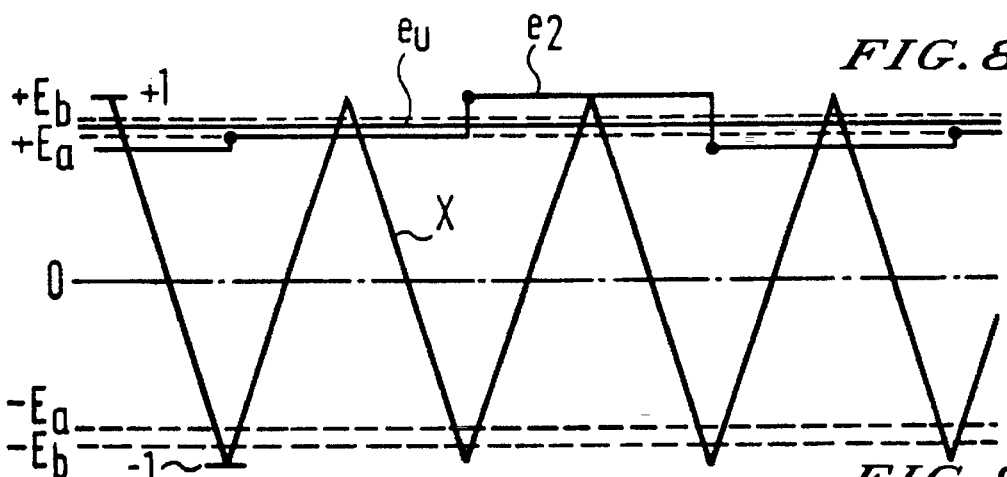
FIG. 8 is a time chart to illustrate the control operation in FIG. 6.
Figure 8B:
Figure 8C:
Figure 8D:
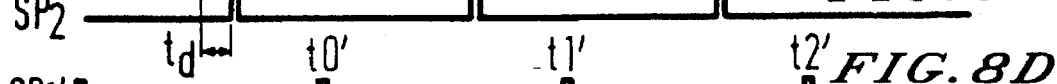
Figure 8E:
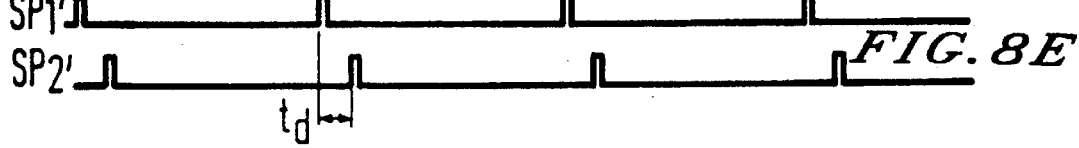
Figure 8F:
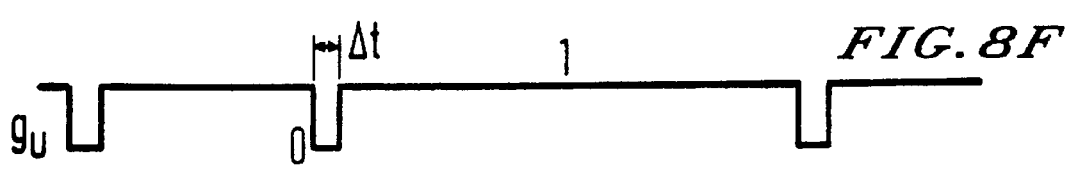
Figure 8G:
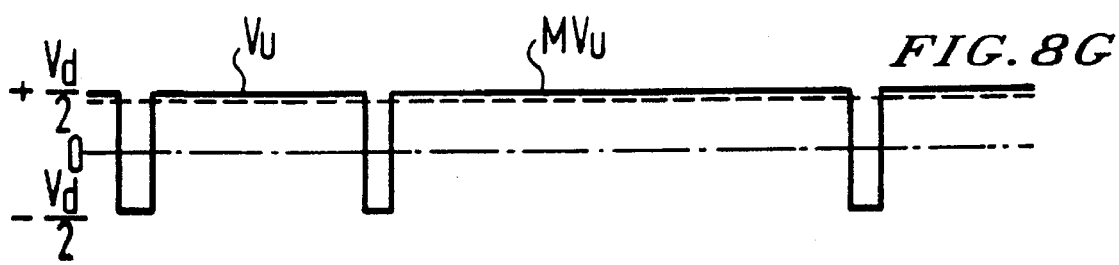

FIG. 7 shows a practical example of the input/output characteristics of signal correction circuit SX. The input is output signal $e_1$ from sample hold circuit $SH_1$. New voltage command value $e_2$ is outputted by comparing signal $e_1$ and level setting values $E_a$ and $E_b$ ($0 \leq E_a \leq E_b \leq 1$) such that

| | |
|---|---|
| when $-E_b \geq e_1$, | $e_2 = -1$ |
| when $-E_b < e_1 < -E_a$, | $e_2 = -E_a$ |
| when $-E_a \leq e_1 \leq +E_a$, | $e_2 = e1$ |
| when $+E_a < e_1 < +E_b$, | $e_2 = +E_a$ |
| when $+E_b \leq e_1$, | $e_2 = +1$. |

Figure 13B:
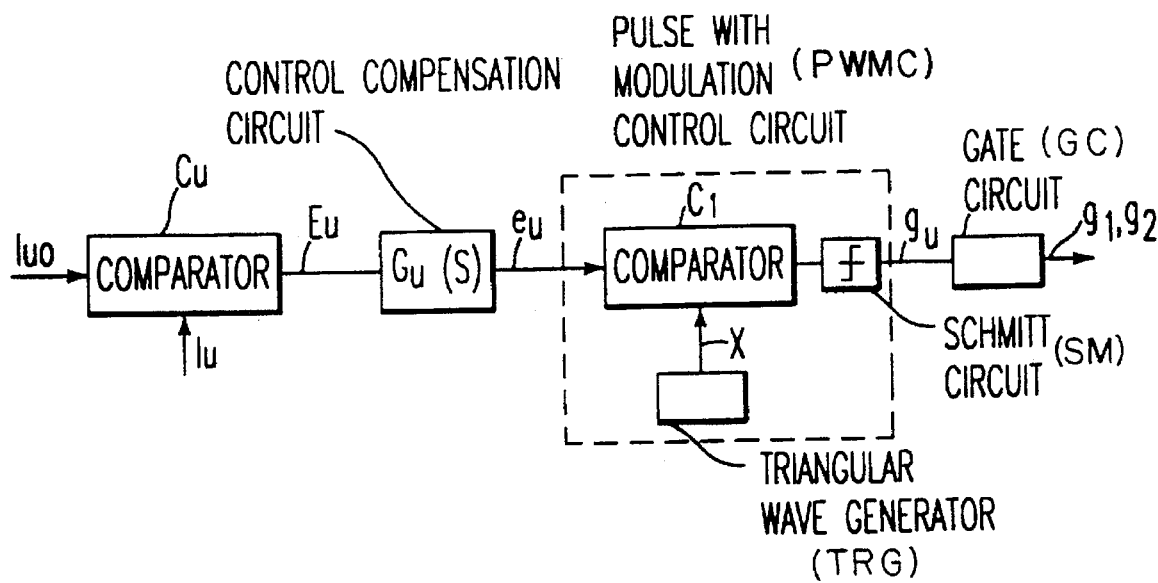
Figure 14:
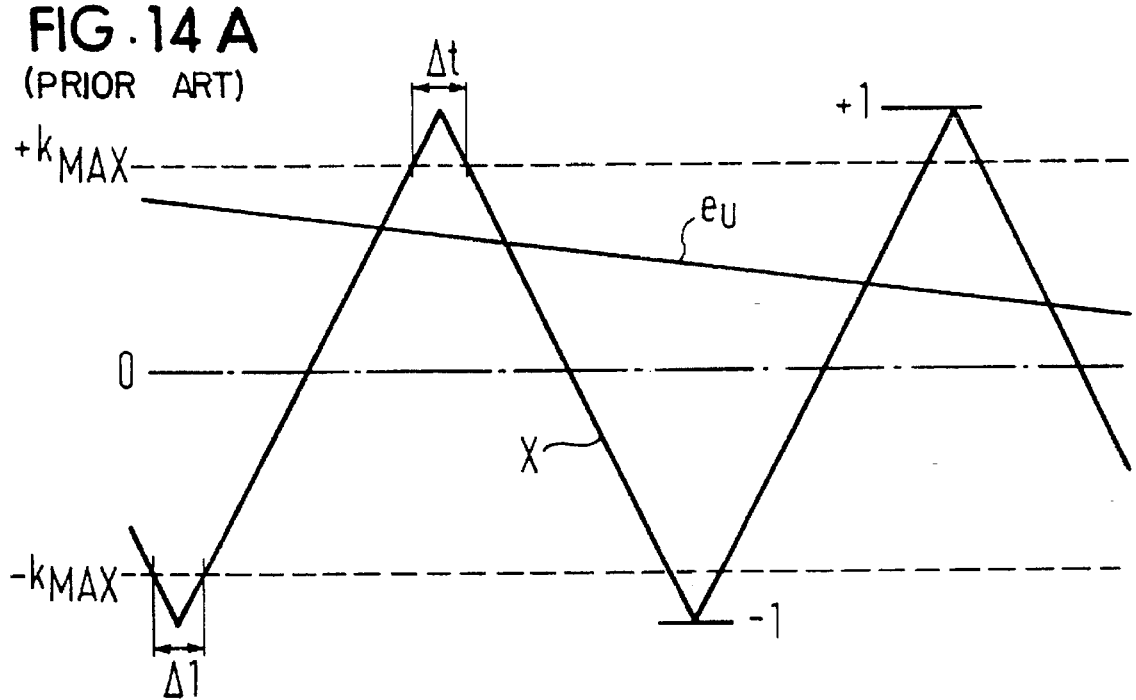
FIG. 14 is a time chart to illustrate the prior art control system in FIG. 13.
Figure 14:
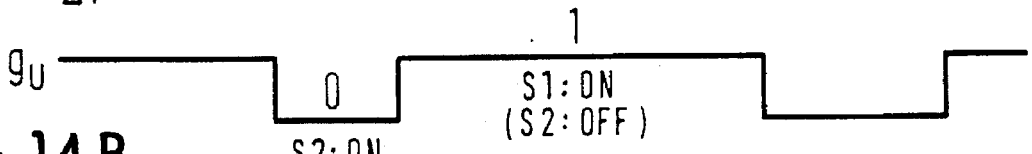
Figure 14:
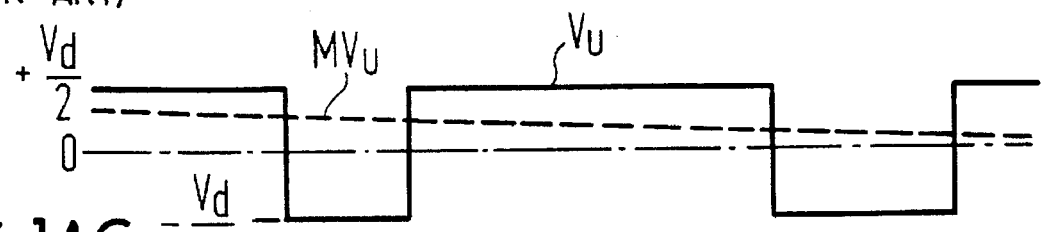

This voltage command value $e_2$ is inputted to PWM control circuit PWMC in FIG. 6. Gate circuit GC receives output gate signal $g_u$ of PWM control circuit PWMC, and outputs gate signals $g_1$ and $g_2$ for self-turn-off devices $S_1$ and $S_2$. The circuit compositions of PWM control circuit PWMC and gate circuit GC are respectively the same as those in FIG. 13(b) and FIG. 4.

The level setting values $E_a$ end $E_b$ of signal correction circuit SX are determined taking account of the minimum ON times $\Delta t$ of the devices. For instance, when taking the maximum value $E_{max}$ of the carrier wave signal as $E_{max}=1$ and the carrier frequency as $f_c$, $$1-E_a=\Delta t \cdot f_c \cdot E_{max}$$

$$1-E_b=(1-E_a)/2$$

are selected.

That is to say, level setting values $E_a$ and $E_b$ are selected so that when the input signal (new voltage command value $e_2$ of PWM control circuit PWMC is $e_2=E_a$, the period of gate signal $g_u=0$ which is supplied to the device becomes $\Delta t$. When taking $\Delta t=200$ μsec, $f_c=500$ Hz, level setting values $E_a$ and $E_b$ become $E_a=0.8$ and $E_b=0.9$. Also, in this case, level setting value $E_a$ is set equal to the maximum modulation factor $K_{MAX}$ OF PWM control.

Returning to FIG. 6, subtractor $A_2$ computes the difference between the input and output signals of signal correction circuit SX. This is taken as error signal $\Delta e=e_1-e_2$ and is inputted to second sample hold circuit $SH_2$. Second sample hold circuit $SH_2$ operates in synchronization with PWM control carrier wave signal X from PWM control circuit PWMC, however it operates by shifting its timing slightly from the operation of first sample hold circuit $SH_1$.

In the case of the absolute value of original voltage command value $e_u$ being small, that is to say when $-E_a \leq e_1 \leq E_a$ new voltage command value $e_2$ becomes $e_2=e_1$, and the power converter is PWM controlled in the same way as in prior art. Also, the error signal $\Delta e$ becomes zero and the output of second hold circuit $SH_2$ also becomes zero.

The case of the absolute value of the PWM control input signal (voltage command value) $e_u$ having become great, that is to say the operation when $e_u<-E_a$ or $e_u>+E_a$, is as follows. This operation is described with reference to FIG. 8, taking as an example the case when $E_a=0.8$, $E_b=0.9$ and voltage command value $e_u=+0.85=$constant.

In FIG. 8, $e_u$ shows original voltage command value, X is PWM control carrier wave signal, $e_2$ is new PWM control input signal, $SP_1$ and $SP_2$ are timing signals for sample hold circuits $SH_1$ and $SH_2$ when $e_u>0$, $SP_1'$ and $SP_2'$ are timing signals for sample hold circuits $SH_1$ and $SH_2$ when $e_u>0$, $g_u$ is gate signal and $V_u$ is inverter output voltage.

Since $e_u>0$, sample hold circuits $SH_1$ and $SH_2$ operate with timing signals $SP_1$ and $SP_2$.

First, first sample hold circuit $SH_1$ is operated in synchronization with PWM control carrier wave signal (carrier signal) X, and takes in the sum of original voltage command value $e_u$ and error signal $\Delta e$ held in second sample hold circuit $SH_2$. First of all, when taking $\Delta e=0$ at time to, the addition value $e_1$ becomes $e_1=e_u+\Delta e=+0.85$. Therefore since $+E_a<e_1<E_b$, the output $e_2$ of signal correction circuit SX becomes $e_2=+E$ and is inputted to PWM control circuit PWMC.

In PWM control circuit PWMC the signal $e_2=+E_a$ and carrier wave signal X are compared, and a gate signal with a pulse-width in which the period of gate signal $g_u=0$ satisfies the minimum ON time $\Delta t$ is transmitted to the power converter. The power converter Generates voltage $V_u$ which is proportional to value $+E_a=+0.8$. This means that voltage $V_u$ is outputted which is smaller by a portion proportional to $e_1-E_a=0.05$. Sample hold circuit $SH_2$ is also operated in synchronization with carrier wave signal X, but it is operated delayed by a time $t_d$ from sample hold circuit $SH_1$. Therefore, $\Delta e=e_1-E_a=0.05$ is held as the error signal. This error signal $\Delta e$ is once again added to voltage command value $e_u=+0.85$. Thus, signal $e_1=e_u+\Delta e=0.9$ is inputted to signal correction circuit SX by the next operation of first sample hold circuit $SH_1$ at time $t_1$.

Therefore this time signal $e_1$ becomes $+E_a \leq e_1 \leq 1$, and $e_2=1$ is inputted to PWM control circuit PWMC. At $e_2=1$, there will be no period of gate signal $g_u=0$ and the output voltage $V_u$ of the power converter will be maximum. Therefore this means that more voltage is outputted as voltage $V_u$ by a portion proportional to $1-e_u=0.15$ than in the case when original voltage command value $e_u$ is used as it stands. Since a smaller voltage was outputted under the previous control by a portion proportional to $e_u-E_a=0.05$, in total voltage $V_u$ will become greater by a portion proportional to $0.15-0.05=0.1$. At this time, error signal $\Delta e$ becomes $\Delta e=e_1-e_2=-0.1$ and is held in sample hold circuit $SH_2$.

Furthermore, when signal $e_u=+0.85$ is inputted at time $t_2$, the above error signal $\Delta e=-0.1$ is added, and signal $e_1=e_u+\Delta e=0.75$ is inputted to signal correction circuit SX. Therefore signal $e_1$ becomes $e_1<+E_a$ and voltage command value $e_2=e_1=0.75$ is supplied to the PWM control circuit PWMC. Therefore this means that voltage $V_u$ is outputted which is smaller by a portion proportional to $e_u-e_2=0.1$ than in the case when original voltage command value $e_u=0.85$ is used at it stands. Since a greater voltage was outputted as voltage $V_u$ under the previous control by a portion proportional to 0.1, in total the error will be zero. At this time, the error signal $\Delta e$ becomes $\Delta e=e_1-e_2=0$, and this is held in second sample hold circuit $SH_2$. That is to say, second sample hold circuit $SH_2$ holds the latest total error voltage (accumulated value). This error signal $\Delta e$ is corrected every one cycle of PWM control carrier wave X so that its absolute value never becomes greater than $(1-E_b)=0.1$. Therefore, as long as voltage command value $e_u$ does not change suddenly, the mean value $MV_u$ of converter output voltage $V_u$ becomes a value proportional to original voltage command value $e_u$.

When original voltage command value $e_u$ has become $e_u<-E_a$, sample hold circuit $SH_1$ operates by timing signal $SP_1'$ at times $t_0'$, $t_1'$, $t_2'$. Sample hold circuit $SH_2$ operates by timing signal $SP_2'$ at times delayed by time $t_d$, respectively. Thus, while period of gate signal $g_u=1$ satisfies the minimum ON time (or minimum OFF time) $\Delta t$, converter output voltage $V_u$ becomes a value proportional to voltage command value $e_u$.

In this way, when using this embodiment of the power converter control system of this invention in FIG. 6, if original voltage command value $e_u$ enters the region of $e_u<-E_a$ or $e_u>+E_a$, a voltage $V_u$ proportional to voltage command value $e_u$ can be generated from the converter mean value-wise while selecting either the generation of a pulse which satisfies the minimum ON time (or minimum OFF time) $\Delta t$ of the device, or the elimination of the pulse. As a result, the utilization factor of the converter can be increased to 100%.

Here, the description has been given taming $E_b=0.9$. However, similar results can be achieved in the region of $E_a \leq E_b \leq 1$.

Carrier wave frequency $f_c$ of PWM control circuit PWMC in the embodiment in FIG. 6 differs from that in the embodiment in FIG. 1, and is constant. However, the two embodiments have a common point in that, in the case of the absolute value of original voltage command value $e_u$ becoming greater than a certain level of setting value $E_a$, output voltage $V_u$ of the converter can be generated proportional to voltage command value $e_u$ at a constant pulse-width $\Delta t$ such that the period of gate signal $g_u=0$ (or the period of gate signals $g_u=1$) satisfies the minimum ON time (or minimum OFF time) of the device and by adjusting the interval of that pulse, in other words, by adjusting the pulse density.

Figure 9:
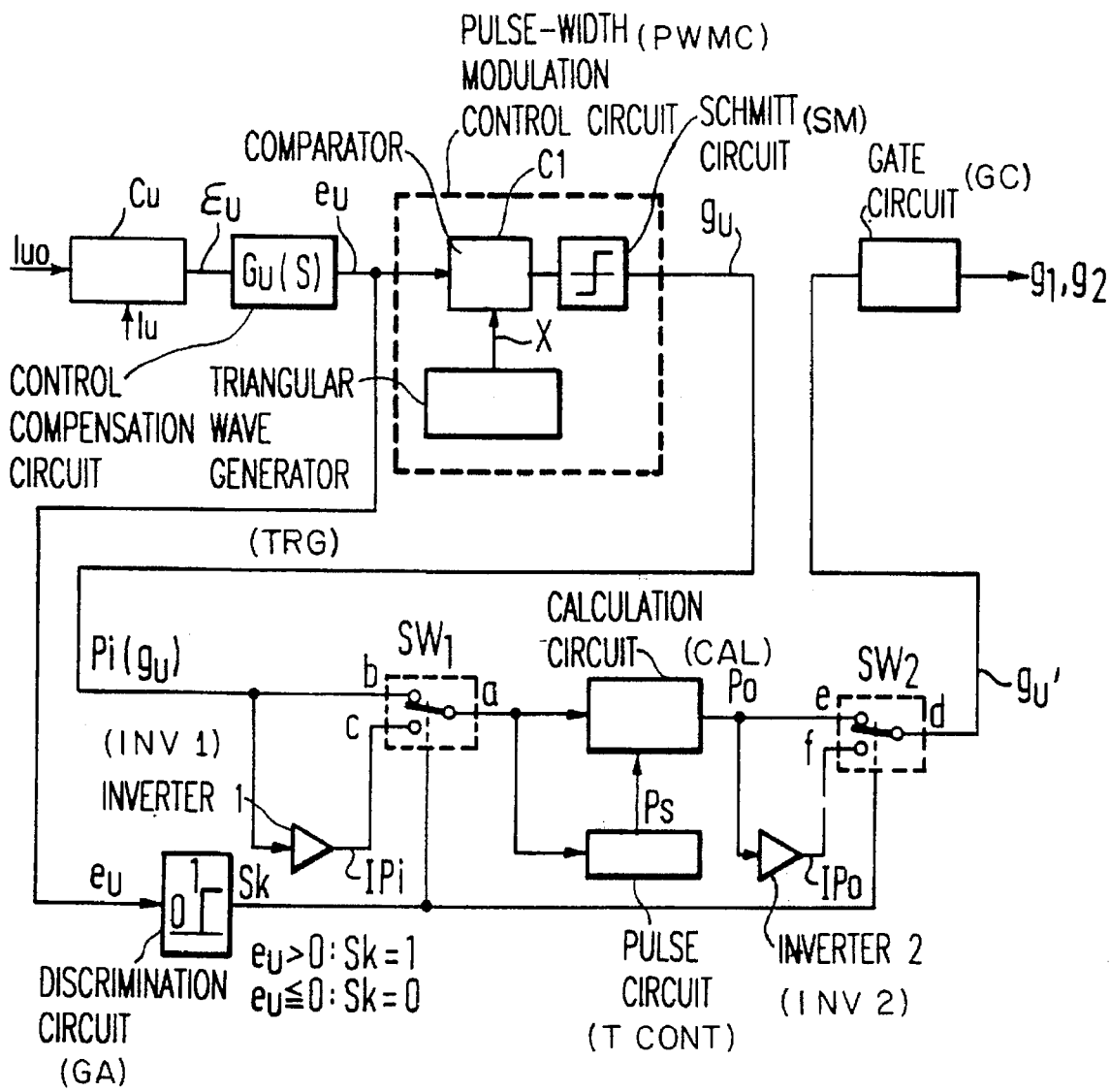
FIG. 9 is a control block diagram showing a further embodiment of the power converter control system of this invention.

Next, a further embodiment of this invention is described with reference to the drawings. FIG. 9 shows part, that is to say the U-phase only, of the power converter control system of the PWM control of this invention.

In FIG. 9,

Ga is a discrimination circuit which outputs a discrimination signal $Sk(=1)$ when voltage command value $e_u$ is positive and a discrimination signal $Sk(=0)$ when it is negative;

SW1 and SW2 are switches which operate in response to the output signals of discrimination circuit Ga;

CAL is a calculation circuit which has a memory which stores an error time $\Delta ti$ when a pulse width ti of a control pulse Pi is narrower than a set time ts, as described later;

TCONT is a pulse circuit which outputs pulse Ps of a width of set time ts; and

INV1 and INV2 are inversion circuits.

In the case of a 3-phase load, the portions for the other two phases (V and W phases) are composed in the same way.

The following is a description of the control operation. This is for the case of voltage command value $e_u$ being positive end discrimination signal Sk being Sk=1.

In FIG. 9, control pulse Pi($g_u$), which is obtained by the comparison of voltage command value $e_u$ and triangular wave X from carrier wave generator TRG, is inputted to a terminal b of switch SW1 and to inversion circuit INV1. Voltage command value $e_u$ is inputted to discrimination circuit Ga. Also, an output signal IPi of inversion circuit INV1 is inputted to a terminal c of switch SW1, and output signal Sk of discrimination circuit Ga is inputted to switches SW1 and SW2.

Next, in switch SW1, terminal b is connected to a terminal a when discrimination signal Sk=1, and output Pi applied to terminal b is inputted to calculation circuit CAL and pulse circuit TCONT. Pulse circuit TCONT outputs pulse Ps in synchronization with input pulse Pi to calculation circuit CAL. Calculation circuit CAL executes a logic operation using inputted pulses Pi and Ps, and outputs pulse Po. This is inputted to a terminal e of switch SW2 and to inversion circuit INV2. Output pulse IPo of inversion circuit INV2 is inputted to a terminal f of switch SW2. In switch SW2, terminal e is connected to a terminal d when discrimination signal Sk=1, and terminal d outputs gate signal $g_u'$. Gate circuit GC receives gate signal $g_u'$ and outputs gate signal $g_1$ and $g_2$ for self-turn-off devices $S_1$ and $S_2$.

Figure 10:
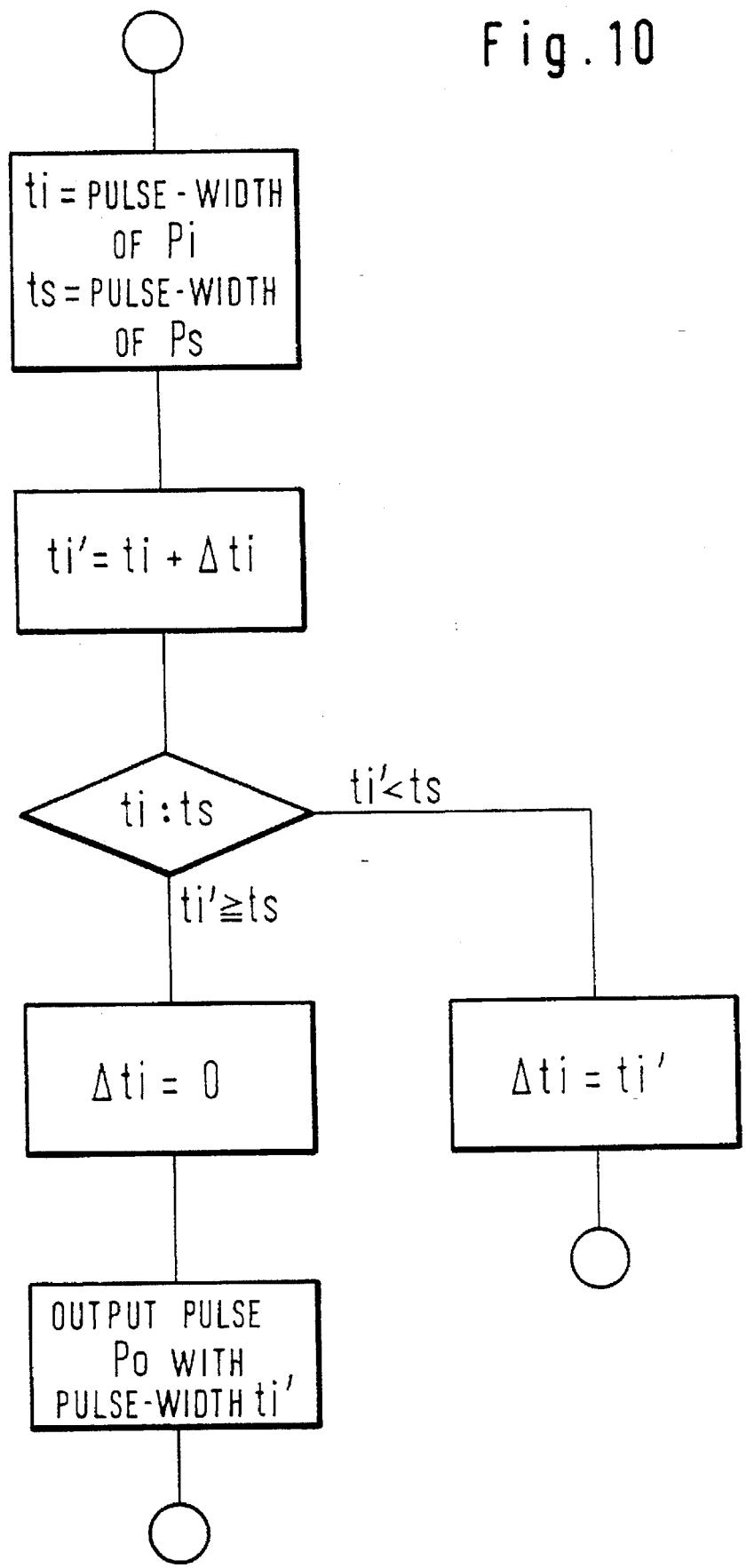
FIG. 10 is a flow-chart to illustrate the operating process of FIG. 9.

In the case of signal Sk=0, terminals c and a are connected in switch SW1, terminals f and d are connected in switch SW2, and signals IPi and IPo are used for the control. FIG. 10 shows an operation flow-chart for calculation circuit CAL. This describes the case of voltage command value $e_u$ is $e^u$>0. In the flow-chart, ti is the pulse-width of input pulse Pi selected by switch SW1, and ts shows the width of pulse Ps for time-setting. Calculation circuit CAL measures the pulse-width ti and ts of the initially inputted pulses Pi and Ps using commonly-known methods.

Next, when pulse-width ti is inputted, error time $\Delta$ti which is stored in a memory (not illustrated) is added to it, and that addition value ti'=ti+$\Delta$ti is inputted to a comparator.

In the comparator, when ti'>ts, control pulse Po of pulse-width ti' is outputted as it stands, and error time $\Delta$ti=0 is stored in the memory; and when ti'<ts, error time $\Delta$ti=ti' is stored in the memory without outputting pulse Po. That is to say, the calculation is executed so that a new control pulse is generated by adding that error time $\Delta$ti to the following control pulse.

Next, the PWM control operation waveforms of this embodiment are shown.

FIG. 11 is the case when voltage command value $e_u$ is positive and discrimination signal Sk is Sk=1.

In the drawing, $ti_n$ is the pulse-width of control pulse Pi obtained by the comparison of voltage command value $e_u$ and triangular wave X, and ts shows the set time ($-t_{off}$; minimum OFF time of the device), where $n$ is the number of the input pulse.

Firstly, error time $\Delta$ti is set to $\Delta$ti=0 (initial value), and when pulse-width $ti_1$ of first control pulse Pi is inputted, pulse-width $ti_1$ is adjusted to new pulse-width $ti_1'$=$ti_1$+$\Delta$ti. However, since error time $\Delta$ti is $\Delta$ti=0, pulse-width ti', becomes $ti_1'$=$ti_1$ and $ti_1'$<ts. Therefore control pulse Po is not outputted.

As a result, error time $\Delta$ti becomes $\Delta$ti=$ti_1'$ (=$ti_1$), and this is stored in the memory.

Next, when pulse-width $ti_2$ of second control pulse Pi is inputted, pulse-width $ti_2$ is adjusted to $ti_2'$=$ti_2$+$\Delta$ti. As a result, pulse-width $ti_2'$ becomes $ti_2'$=$ti_2$+ti and $ti_2'$≧ts. Therefore pulse Po of control pulse-width $ti_1'$ is outputted. Therefore, error time $\Delta$ti becomes $\Delta$ti=0, and this is stored in the memory.

When pulse-width $ti_3$ of third control pulse Pi is inputted, pulse-width $ti_3'$, which has been adjusted in the same way as in the case of the first pulse becomes $ti_3'$ (=$ti_3$)<ts, and control pulse Po is not outputted. Thus error time $\Delta$ti becomes $\Delta$ti=$ti_3'$=$ti_3$, and this is stored in the memory. When pulse-width $ti_4$ of fourth control pulse Pi is inputted, pulse-width $ti_4$ is adjusted to $ti_4$=$ti_4$+$\Delta$ti=$ti_4$+$ti_3$. However, since $ti_4'$<ts, no control pulse Po is outputted. As a result, the new error time $\Delta$ti becomes $\Delta$ti=$ti_4'$=$ti_4$+$ti_3$, and this is stored in the memory.

Pulse-width $ti_5$ of fifth control pulse Pi is wider than set time ts. However, pulse-width $ti_5$ is adjusted to $ti_5'$=$ti_5$+$\Delta$ti (=$ti_5$+$ti_4$+$ti_3$). As a result, $ti_5'$≧ts, and control pulse Po is outputted, and error time $\Delta$ti becomes $\Delta$ti=0. As a result, output pulse Po is inputted as it stands from terminal d to gate circuit GC as gate signal $g_u'$.

FIG. 12 shows the case when voltage command value $e_u$ is negative and discrimination signal Sk is Sk=0.

Input pulse Pi is inverted by inversion circuit INV1 and is inputted to calculation circuit CAL as inverted pulse IPi, and calculation is executed in the same way as in FIG. 10. In this case, pulse-width ti should be read as the pulse-width of inverted pulse IPi in FIG. 10. The output pulse Po of calculation circuit CAL is inverted by inversion circuit INV2 and becomes inverted pulse IPo. This is inputted to gate circuit GC from terminal d as gate signal $g_u'$.

As described above, pulse-width ti' of adjusted control pulse Pi and the set time ts are compared. When ti'≧ts, a control pulse Po of pulse-width ti' is outputted as it stands. When ti'<ts, control pulse Po is not outputted, but error time 'ti=ti' is stored in the memory. By reflecting that error time $\Delta$ti in the following control pulse, an output voltage proportional to voltage command value $e_u$ is obtained. Thus, the utilization factor of the power converter can be increased.

The above is a description for the U phase of the power converter. However, the same effect can be achieved for the V phase and the W phase. Needless to say, the same effect can be achieved in the case of a 3-phase 3-wire load.

Also, the above embodiments have been described for an inverter which converts DC power to AC power. Needless to say this invention can be applied in the same way for a converter which converts AC power to DC power.

When using the power converter control system of this invention, it is possible continuously to obtain output voltage of the power converter proportional to voltage command value, even if the absolute value of the voltage command value is in the region where it is greater than the maximum modulation factor of PWM control. Also, it is possible to satisfy the minimum ON time or minimum OFF time of the devices which compose the power converter.

Also, when using the power converter control system of this invention, output voltage of the power converter can continuously be obtained proportional to voltage command value, by adding error time to pulse-width of control pulse; finding new control pulse-width; comparing this new pulse-width with set time and outputting a control pulse in response to that result, even if the absolute value of the voltage command value is in the region where it is greater than the maximum modulation factor of PWM control. Also, it is possible to satisfy the minimum ON time or minimum OFF time of the devices which compose the converter.

As a result, in the case of PWM control of power converters such as inverters or converters, it is possible greatly to increase the utilization factor of those converters. Thus it is possible to reduce voltage of the direct current power source by that amount. Therefore reduction in size of the power converter, increased efficiency and cost-reduction can be achieved.

Obviously, numerous modifications and variations of the present invention are possible in light of the above teachings. It is therefore to be understood that within the scope of the appended claims, the invention may be practiced otherwise than as specifically described herein.

What is claimed is:

1. A control system for a pulse-width modulation controlled power converter, said power converter being composed of self-turn-off devices, said control system comprising:

voltage command value generating means for generating a voltage command value for an output of said power converter;

carrier wave generator means for generating a carrier wave with a frequency;

correction means for correcting said frequency of said carrier wave to generate as corrected carrier wave; and gate pulse signal generating means for receiving a first signal and a second signal as two input signals and for comparing said first signal with said second signal to generate gate pulse signals to said self-turn-off devices for controlling said output voltage of said power converter based on a comparison result;

said voltage command value being taken as e ($-1 \leq e \leq +1$), and a level setting value being taken as $E_a$ ($0 < E_a < 1$);

said gate pulse signal generating means receiving said voltage command value as said first signal and said carrier wave as said second signal when $-E_a \leq e \leq +E_a$; and said gate pulse signal generating means receiving said voltage command value as said first signal and said corrected carrier wave as said second signal when $e < -E_a$ or $+E_a < e$.

2. The control system according to claim 1, wherein:

said carrier wave generator means generates said carrier wave with said frequency $f_{co}$; and said correction means corrects said frequency of said carrier wave to $f_{co} \cdot (1-|e|)/(1-E_a)$.

3. The control system according to claim 2, wherein:

said correction means includes, a function generator connected to receive said voltage command value (e) for generating said corrected voltage command value eo;

said corrected voltage command value (eo) being determined such that eo=Eo (constant) when $|e| \leq E_a$, and eo=Eo·(1-|e|)/(1-$E_a$) when $|e| > E_a$, and a voltage/frequency converter connected to receive said corrected voltage command value for generating a clock signal with a frequency proportional to said corrected voltage command value; and said carrier wave generator means receives said clock signal end determines said frequency of said corrected carrier wave based on said frequency of said clock signal.

4. The control system according to claim 3, wherein said voltage command value generating means includes:

means for generating a current command value for said power converter;

a comparator for comparing a load current of said power converter with said current command value; and means for generating said voltage command value based on a comparison result of said comparator.

5. A control system for a pulse-width modulation controlled power converter, said power converter being composed of self-turn-off devices, said control system comprising:

voltage command value generating means for generating a voltage command value for an output voltage of said power converter;

carrier wave generator means for generating a carrier wave with a frequency;

correction means for correcting said voltage command value to generate as a corrected voltage command value $e_2$; and gate pulse signal generating means for receiving a first signal and a second signal as two input signals and for comparing said first signal with said second signal to generate gate pulse signals to self-turn-off devices for controlling said output voltage of said power converter based on a comparison result;

said voltage command value being taken as e ($-1 \leq e \leq +1$), and a level setting value being taken as $E_a$ ($0 < Ea < 1$);

said gate pulse signal generating means receiving said voltage command value as said first signal and said carrier wave as said second signal when $-E_a \leq e \leq +E_a$; and said gate pulse signal generating means receiving said corrected voltage command value as said first signal and said carrier wave as said second signal when $e < -E_a$ or $+E_a < e$, wherein said correction means includes:

an adder for adding said voltage command value (e) and a sample-held error signal ($\Delta e$);

a first sample hold circuit for sample-holding an output signal $e_1$ (e+$\Delta e$) of said adder every specified cycle;

a signal correction circuit connected to receive said output signal ($e_1$=e+$\Delta e$) of said first sample hold circuit for generating said corrected voltage command value ($e_2$);

a subtractor for generating said error signal ($\Delta e$) by subtracting said corrected voltage command value ($e_2$) from said output signal ($e_1$) of said first sample hold circuit; and a second sample hold circuit for sample-holding said error signal ($\Delta e$) every said specified cycle at a timing which is delayed from the sample hold timing of said first sample hold circuit; and wherein said corrected voltage command value ($e_2$) is determined by comparing said output signal ($e_1$) with said level setting value ($E_a$) and a level setting value $E_b$, $-(0 < E_a < E_b)$ as follows:

| | |
|---|---|
| when $-E_b > e_1$, | $e_2 = -1$; |
| when $-E_b < e_1 < -E_a$, | $e_2 = -E_a$; |
| when $-E_a < e_1 < +E_a$, | $e_2 = e_1$; |
| when $+E_a < e_1 < +E_b$, | $e_2 = +E_a$; and |
| when $+E_b < e_1$, | $e_2 = +1$. |

6. The control system according to claim 5, wherein said voltage command value generating means includes:

means for generating a current command value for said power converter;

a comparator for comparing a load current of said power converter with said current command value; and means for generating said voltage command value based on a comparison result of said comparator.

7. A control system for a pulse-width modulation controlled power converter, said power converter being composed of self-turn-off devices, said control system comprising:

voltage command value generating means for generating a voltage command value for an output voltage of said power converter;

carrier wave generator means for generating a carrier wave with a frequency;

gate pulse signal generating means for receiving said voltage command value and said carrier wave as two input signals and for comparing said voltage command value and said carrier wave to generate gate pulse signals based on a comparison result; and correction means connected to receive said voltage command value and said gate pulse signals for generating corrected gate pulse signals to said self-turn-off devices for controlling said output voltage of said power converter;

said voltage command value being taken as e ($-1 \leq e \leq +1$), and a level setting value being taken as $E_a$ ($0 < E_a < 1$);

said correction means generating said gate pulse signals as said corrected gate pulse signals as they stand, when $-E_a \leq e \leq +E_a$; and said correction means correcting a pulse-width (ti) of said gate pulse signals when $e < -E_a$ or $+E_a < e$ and generating gate pulse signals with a corrected pulse-width (ti') as said corrected gate pulse signals only when said corrected pulse-width (ti') is equal to or larger than a set time (ts).

8. The control system according to claim 7, wherein said correction means includes:

means for detecting a pulse-width (ti) of said Gate pulse signals;

means for generating said set time (ts);

a memory for storing an error time ($\Delta$ti);

means for obtaining said corrected pulse-width (ti') by adding said pulse-width (ti) of said gate pulse signals and said error time ($\Delta$ti) stored in said memory;

means for comparing said corrected pulse-width (ti') with said set time (ts);

means for generating said gate pulse signals having said corrected pulse-width (ti') as said corrected gate pulse signals and outputting said error time ($\Delta$ti=0) to said memory when said corrected pulse-width (ti') is equal to or larger than said set time (ts); and means for outputting said corrected pulse-width (ti') to said memory as said error time ($\Delta$ti) without generating said corrected gate pulse signals when said corrected pulse-width (ti') is smaller than said set time (ts); and said memory storing said outputted error time ($\Delta$ti).

9. The control system according to claim 7, wherein said correction means includes:

discrimination means for discriminating a sign of said voltage command value;

first inversion means for outputting said gate pulse signals as they stand or inverted as first gate pulse signals based on an output of said discrimination means;

means for detecting a pulse-width (ti) of said first gate pulse signals;

means for generating said set time (ts);

a memory for storing an error time ($\Delta$ti); means for obtaining said corrected pulse-width (ti') by adding said pulse-width (ti) of said first gate pulse signals and said error time ($\Delta$ti) stored in said memory;

means for comparing said corrected pulse-width (ti') with said set time (ts);

means for generating said gate pulse signals having said corrected pulse-width (ti') as second gate pulse signals and outputting said error time ($\Delta$ti=0) to said memory when said corrected pulse-width (ti') is equal to or larger than said set time (ts);

means for outputting said corrected pulse-width (ti') to said memory as said error time ($\Delta$ti) without generating said second gate pulse signals when said corrected pulse-width (ti') is smaller than said set time (ts); and second inversion means for outputting said second gate pulse signals as they stand or inverted as said corrected gate pulse signals based on said output of said discrimination means; and said memory storing said outputted error time ($\Delta$ti).

10. The control system according to claim 9, wherein said voltage command value generating means includes:

means for generating a current command value for said power converter;

a comparator for comparing a load current of said power converter with said current command value; and means for generating said voltage command value based on a comparison result of said comparator.

* * * * *